(12) United States Patent
Saha et al.

(10) Patent No.: US 12,242,663 B2
(45) Date of Patent: Mar. 4, 2025

(54) SENSOR UNIT WITH ON-DEVICE UNSUPERVISED LEARNING AND CLASSIFICATION

(71) Applicant: STMICROELECTRONICS, INC., Coppell, TX (US)

(72) Inventors: Swapnil Sayan Saha, Fremont, CA (US); Mahesh Chowdhary, San Jose, CA (US)

(73) Assignee: STMICROELECTRONICS, INC., Coppell, TX (US)

( * ) Notice: Subject to any disclaimer, the term of this patent is extended or adjusted under 35 U.S.C. 154(b) by 0 days.

(21) Appl. No.: 18/063,584

(22) Filed: Dec. 8, 2022

(65) Prior Publication Data

US 2024/0192762 A1    Jun. 13, 2024

(51) Int. Cl.
*G06F 3/01*  (2006.01)
*G06F 1/16*  (2006.01)
*G06F 3/0346*  (2013.01)

(52) U.S. Cl.
CPC .............. *G06F 3/011* (2013.01); *G06F 1/163* (2013.01); *G06F 3/017* (2013.01); *G06F 3/0346* (2013.01)

(58) Field of Classification Search
CPC .......... G06F 3/011; G06F 1/163; G06F 3/017; G06F 3/0346
See application file for complete search history.

(56) References Cited

U.S. PATENT DOCUMENTS

| | | | |
|---|---|---|---|
| 9,357,054 B1 * | 5/2016 | Froment | H04M 1/72454 |
| 10,824,954 B1 * | 11/2020 | Tilton | G06V 40/25 |
| 10,854,104 B2 | 12/2020 | Mettler May | |
| 2010/0052851 A1 * | 3/2010 | Kaehler | H04L 63/0861 |
| | | | 340/5.81 |
| 2011/0081634 A1 * | 4/2011 | Kurata | H04W 4/33 |
| | | | 434/236 |
| 2012/0253486 A1 * | 10/2012 | Niemimaki | A61B 5/1123 |
| | | | 700/91 |
| 2017/0281054 A1 * | 10/2017 | Stever | A61B 5/0024 |

(Continued)

OTHER PUBLICATIONS

Cai et al., "TinyTL: Reduce Memory, Not Parameters for Efficient On-Device Learning," 34th Conference on Neural Information Processing Systems (NeurIPS 2020), Vancouver, Canada. (13 pages).

(Continued)

*Primary Examiner* — Amit Chatly
*Assistant Examiner* — Chayce R Bibbee
(74) *Attorney, Agent, or Firm* — Seed IP Law Group LLP

(57) ABSTRACT

An electronic device includes a sensor unit. The sensor unit includes a sensor and low power, low area sensor processing unit. The sensor processing unit performs an unsupervised machine learning processes to learn to recognize an activity or motion of the user or device. The user can request to learn the new activity. The sensor processing unit can request that the user remain stationary for a selected period of time before performing the activity. The sensor processing unit records sensor data while the user performs the activity and generates an activity template from the sensor data. The sensor processing can then infer when the user is performing the activity by comparing sensor signals to the activity template.

22 Claims, 16 Drawing Sheets

(56) References Cited

U.S. PATENT DOCUMENTS

2021/0290106 A1    9/2021  Stever et al.
2022/0299338 A1*   9/2022  Mathur ............... G01C 21/206

OTHER PUBLICATIONS

Hammerla et al., "Deep, Convolutional, and Recurrent Models for Human Activity Recognition Using Wearables," Proceedings of the Twenty-Fifth International Joint Conference on Artificial Intelligence (IJCAI-16), 2016, pp. 1553-1540.
Lee et al., "Learning in the Wild: When, How, and What to Learn for On-Device Dataset Adaptation," AIChallengeIoT '20, Nov. 16-19, 2020, Virtual Event, Japan, pp. 34-40.
Shen et al., "MiLift: Efficient Smartwatch-Based Workout Tracking Using Automatic Segmentation," *IEEE Transactions on Mobile Computing* 17(7):1609-1622, Jul. 2018.

* cited by examiner

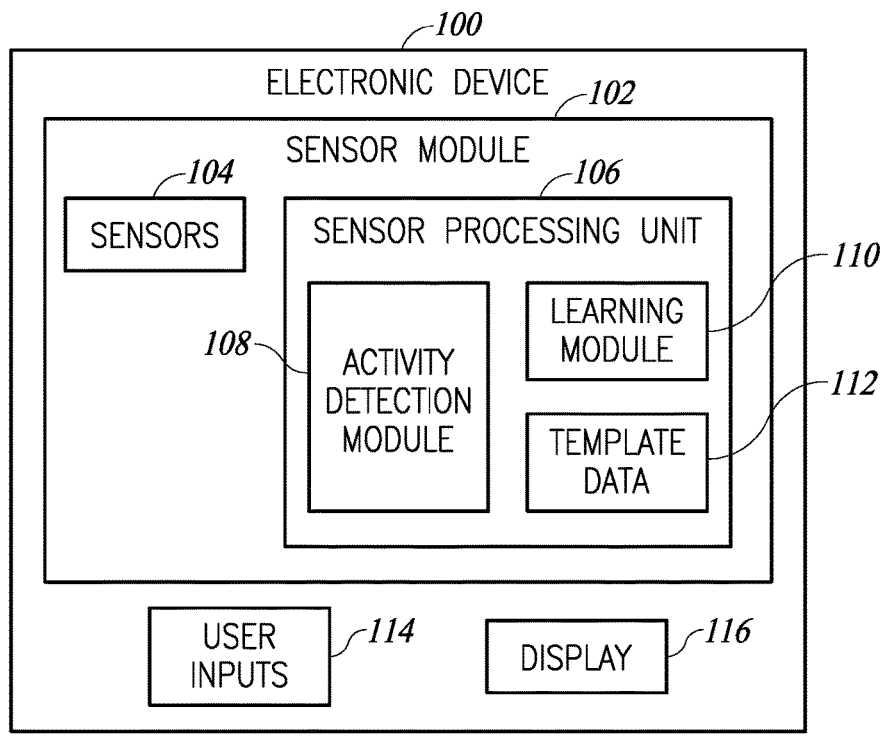
FIG. 1
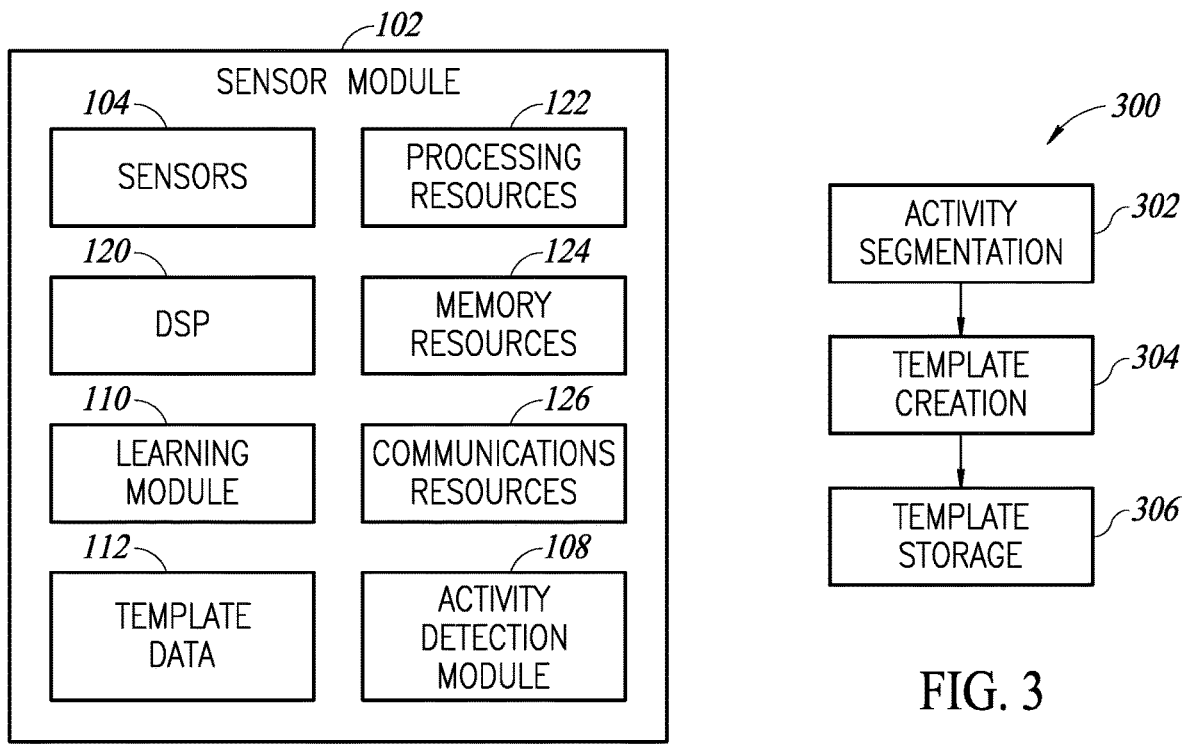
FIG. 2
FIG. 3

SENSOR UNIT WITH ON-DEVICE UNSUPERVISED LEARNING AND CLASSIFICATION

BACKGROUND

Technical Field

The present disclosure is related to electronic devices that include low-power sensor units, and more particularly, to sensor units that sense user and machine activity.

Description of the Related Art

Many types of systems and devices utilize inertial sensors. Inertial sensors can include accelerometers, gyroscopes, or other types of sensors. Inertial sensors can be used in vehicles, mobile phones, tablets, gaming devices, laptop computers, and many other applications.

All of the subject matter discussed in the Background section is not necessarily prior art and should not be assumed to be prior art merely as a result of its discussion in the Background section. Along these lines, any recognition of problems in the prior art discussed in the Background section or associated with such subject matter should not be treated as prior art unless expressly stated to be prior art. Instead, the discussion of any subject matter in the Background section should be treated as part of the inventor's approach to the particular problem, which, in and of itself, may also be inventive.

BRIEF SUMMARY

Embodiments of the present disclosure provide an electronic device with a sensor unit that can efficiently and effectively detect, learn and classify user activity. The sensor unit includes one or more inertial sensors and a sensor processing unit. The sensors generate sensor data. The sensor processing unit processes the sensor data. The sensor processing unit uses unsupervised learning to recognize user activities. A user may request to train the sensor unit to recognize a new motion or activity. The sensor unit prompts the user to remain stationary for a selected duration of time, after which the user begins the motion or activity. The sensor unit records the sensor data during performance of the motion and generates a template for the motion based on the sensor data. After a template has been generated for the motion, the sensor unit can automatically recognize when the user is performing the motion by comparing new sensor data to the template.

In one embodiment, the user can utilize the sensor unit to learn a plurality of motions or activities via unsupervised learning through the generation of templates, as described above. After templates have been generated, the sensor unit can then recognize when the user is performing one of the trained activities by comparing sensor data to the templates and identifying a template that matches the sensor data.

In one embodiment, the electronic device is a wearable device such as a smart watch or other type of device. As the user performs various activities while wearing the wearable device, the wearable device can detect when the user is performing one of the learned activities. Examples of learned activities can include specific strength training exercises, specific aerobic exercises, specific gestures, or other types of activities or motions. When the sensor unit of the wearable device has learned a particular activity or motion, the sensor unit can automatically infer when the user is performing the activity. The sensor unit can automatically count the number of repetitions, the duration, or other characteristics of the activity.

In one embodiment, the sensor unit can be utilized to learn characteristic motions of a machine or device. For example, the machine or device may have multiple operating modes. The sensor unit can utilize unsupervised learning to recognize one or more standard operating modes of the machine or device. After the learning process is complete, the sensor unit can detect anomalous behavior of the machine when new sensor data does not align with any previously learned operating modes. The sensor unit can output an alert that enables a technician to perform inspection, maintenance, part replacement, or other types of operations. The sensor unit can learn to recognize a transportation mode in automotive head gestures in augmented reality (AR)/virtual reality (VR).

In one embodiment, a method includes receiving, with an electronic device, a request from a user to train a sensor unit of the electronic device to recognize a first motion, prompting, with the electronic device, the user to remain stationary for a selected period of time, and prompting, with the electronic device, the user to perform the first motion after remaining stationary for the selected period of time. The method includes generating, with the sensor unit, sensor data while the user performs the first motion generating, with the sensor unit, a first template for the first motion, and storing the first template in a memory of the sensor unit.

In one embodiment, an electronic device include a user input, a display, and a sensor unit. The sensor unit includes a sensor, a learning module configured to perform an unsupervised machine learning process to generate a template representing a first motion of the user based on first sensor data from the sensor. The sensor unit includes an activity detection module configured to detect whether the user is performing the first motion by comparing new sensor data from the sensor to the first template.

In one embodiment, a method includes receiving, from a user of an electronic device, a request to train a sensor unit of the electronic device to recognize a motion and generating, with the sensor unit, a template for the motion by performing an unsupervised machine learning process including recording sensor data while the user performs the motion. The method includes inferring, with the sensor unit after generating the template, that the user is performing the motion based on sensor data recorded after generation of the template.

BRIEF DESCRIPTION OF THE SEVERAL VIEWS OF THE DRAWINGS

Reference will now be made by way of example only to the accompanying drawings. In the drawings, identical reference numbers identify similar elements or acts. In some drawings, however, different reference numbers may be used to indicate the same or similar elements. The sizes and relative positions of elements in the drawings are not necessarily drawn to scale. For example, the shapes of various elements and angles are not necessarily drawn to scale, and some of these elements may be enlarged and positioned to improve drawing legibility.

FIG. 1 is a block diagram of an electronic device including a sensor unit, according to one embodiment.

FIG. 2 is a block diagram of a sensor unit, according to one embodiment.

FIG. 3 is a flow diagram of a method for training a sensor unit, according to one embodiment.

DETAILED DESCRIPTION

Figure 4:
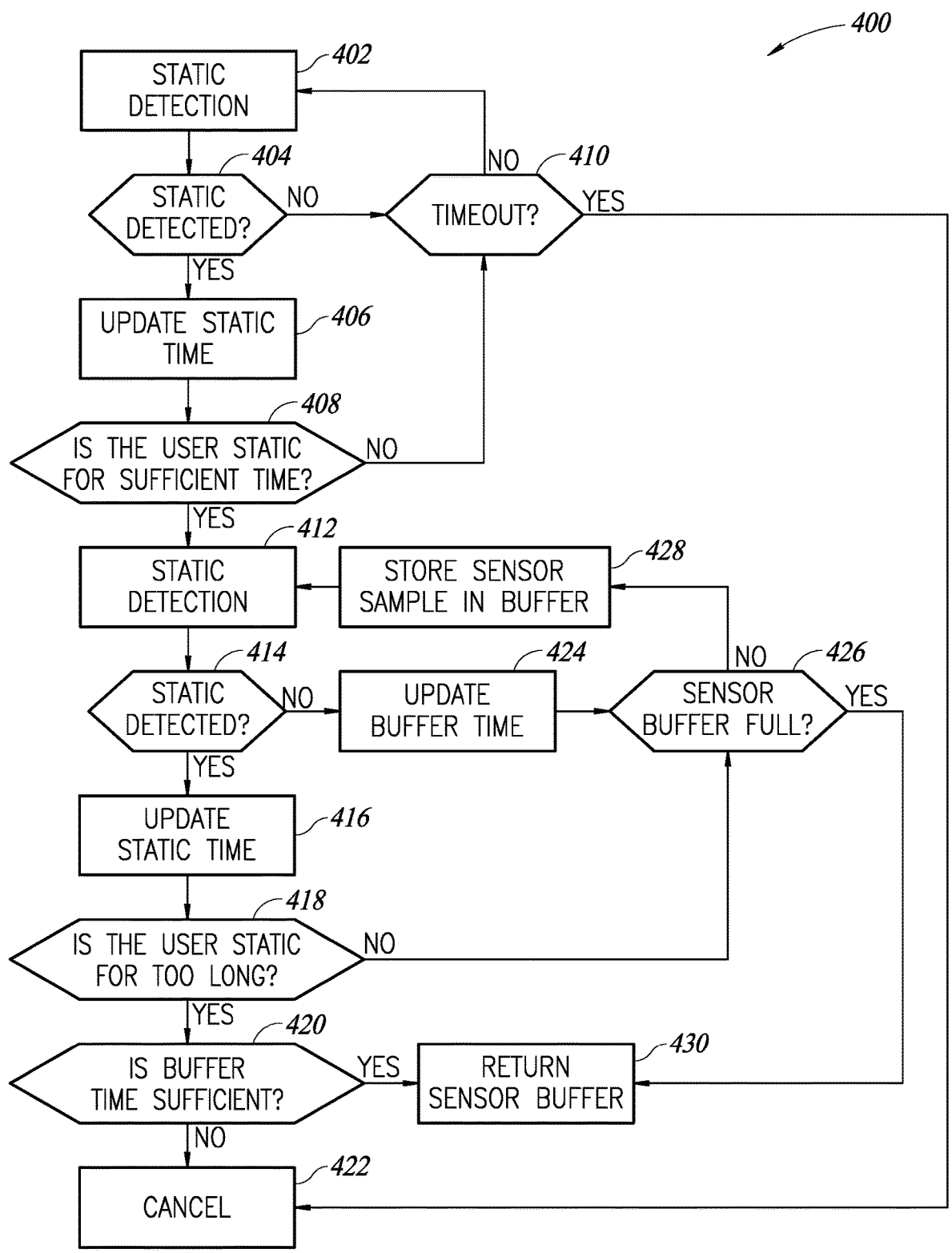
FIG. 4 is a flow diagram of a method for training a sensor unit of an electronic device, according to one embodiment.

In the following description, certain specific details are set forth in order to provide a thorough understanding of various disclosed embodiments. However, one skilled in the relevant art will recognize that embodiments may be practiced without one or more of these specific details, or with other methods, components, materials, etc. In other instances, well-known systems, components, and circuitry associated with integrated circuits have not been shown or described in detail, to avoid unnecessarily obscuring descriptions of the embodiments.

Unless the context requires otherwise, throughout the specification and claims which follow, the word "comprise" and variations thereof, such as, "comprises" and "comprising" are to be construed in an open, inclusive sense, that is as "including, but not limited to." Further, the terms "first," "second," and similar indicators of sequence are to be construed as interchangeable unless the context clearly dictates otherwise.

Reference throughout this specification to "one embodiment" or "an embodiment" means that a particular feature, structure or characteristic described in connection with the embodiment is included in at least one embodiment. Thus, the appearances of the phrases "in one embodiment" or "in an embodiment" in various places throughout this specification are not necessarily all referring to the same embodiment. Furthermore, the particular features, structures, or characteristics may be combined in any suitable manner in one or more embodiments.

As used in this specification and the appended claims, the singular forms "a," "an," and "the" include plural referents unless the content clearly dictates otherwise. It should also be noted that the term "or" is generally employed in its broadest sense, that is as meaning "and/or" unless the content clearly dictates otherwise.

FIG. 1 is a block is a block diagram of an electronic device 100, according to one embodiment. The electronic device 100 includes a sensor module 102. The sensor module 102 can generate and process the sensor data based on the motion of the electronic device 100. As will be set forth in more detail below, the components of the sensor module 102 cooperate to effectively and efficiently learn to recognize activities or motions performed by a user of the electronic device 100. In particular, the sensor module 102 utilizes unsupervised machine learning processes to learn to recognize the activities or motions.

In one embodiment, the electronic device 100 is a device that can be worn or held by a user. In particular, the electronic device 100 can include a smart watch, smart glasses, a mobile phone, a heart rate monitor, an exercise monitor, or other types of electronic devices. Accordingly, the electronic device 100 can include a wearable device or a device that may be held or carried by the user. Other types of electronic devices 100 can be utilized without departing from the scope of the present disclosure.

The sensor module 102 includes one or more sensors 104. The one or more sensors 104 can include inertial sensors. The sensors 104 can include an accelerometer. The accelerometer can include a three axis accelerometer that senses motion in three mutually orthogonal axes. Alternatively, the accelerometer can include a single axis accelerometer or another type of accelerometer.

In one embodiment, the sensors 104 include a gyroscope. The gyroscope can include a three axis gyroscope that senses rotation around three mutually orthogonal axes. Alternatively, the gyroscope can include a single axis gyroscope or another type of gyroscope.

In one embodiment, the sensors 104 may include multiple accelerometers, multiple gyroscopes, an accelerometer and a gyroscope, or multiple accelerometers and multiple gyroscopes. The sensors 104 may include various types and combinations of inertial sensors.

In one embodiment, the sensors 104 include a microelectromechanical system (MEMS) sensor. Accordingly, the accelerometers and gyroscopes described above can include MEMS accelerometers and gyroscopes. A single integrated circuit die may include a plurality of MEMS accelerometers and gyroscopes. Alternatively, accelerometers and gyroscopes may be implemented in separate integrated circuit dies.

The sensors 104 generates sensor data based on the motion of the sensors 104. The sensors 104 may initially generate analog or digital sensor signals based on the motion of the sensors 104. The sensor module 102 may include digital signal processing circuitry that receives the analog sensor signals and generates digital sensor data based on the analog sensor signals. This can include performing analog-to-digital conversion, signal filtering, and other types of digital signal conditioning.

The sensor module 102 includes a sensor processing unit 106. The sensor processing unit 106 receives the sensor data from the sensors and processes the sensor data. Alternatively, the sensor processing unit 106 may receive analog sensor signals from the sensors 104, convert the analog sensor signals into digital sensor data, and may then process the digital sensor data. Accordingly, unless the context dictates otherwise, description of the sensor processing unit 106 receiving sensor data from the sensors 104 can include reception of analog sensor signals from the sensors 104 and converting the analog sensor signals to digital sensor data.

The sensor processing unit 106 can include a microcontroller, a microprocessor, an integrated sensor processing unit (ISPU) or another type of processing circuitry. In one example, the processing unit 106 includes a low power, low area microcontroller with a relatively small amount of memory. The memory can include flash RAM, SRAM, DRAM or other types of memory.

In one embodiment, the sensor module 102 is configured to perform an unsupervised machine learning process to learn to recognize a motion or activity of the user. More particularly, the sensor processing unit 102 is configured to learn to recognize a motion or activity of the user as user wears holes, or otherwise carries the electronic device 100. As the user performs the motion, the electronic device 100 will also be moved. The sensor 104 will generate sensor data as the electronic device 100 moves with the motion of the user. The sensor module 102 can perform an unsupervised machine learning process to recognize the motion or activity of the user.

The sensor processing unit 106 includes an activity detection module 108 and a learning module 110. While FIG. 1 illustrates the activity detection module 108 and the learning module 110 are separate modules, in practice, the learning module 110 and the activity detection module 108 may correspond to a single module or algorithm.

The learning module 110 is configured to learn new activities or motions of the user so that the sensor processing unit 106 can later infer when the user is performing the learned activities or motions. The learning module 110 can be implemented utilizing processing resources and memory resources of the sensor processing unit 106. The learning module 110 can be implemented using firmware or other configuration data executed or implemented by the sensor processing unit 106. The learning module 108 can also include dedicated circuitry for learning new activities or motions of the user.

Before further describing the learning model 110, it is beneficial to discuss other components of the electronic device 100. The electronic device 100 includes user inputs 114. The user inputs 114 can include mechanisms or functionality that enables the user to provide inputs, commands, or responses to the electronic device 100. The user inputs 114 can include a touchscreen, a button, a slider, a dial, keys, or other types of functionality that enable a user to provide inputs, commands, responses, or to otherwise control the electronic device 100. In one embodiment, the user inputs 114 can include wireless communication circuitry that enables the electronic device 100 to communicate with other devices. The user may inputs commands, responses, or other inputs to the electronic device 100, by transmitting such commands, responses, or inputs from another electronic device wirelessly coupled to the electronic device 100. Various other types of user inputs 114 can be utilized without departing from the scope of the present disclosure.

The electronic device 100 includes a display 116. The display 116 can include any circuitry or functionality that enables the electronic device 100 to provide information to the user. The display 116 can include a screen that can display images or text to the user. The display 116 can include indicator lights that can provide indications of the functionality of the electronic device 100 based on illumination schemes of the indicator lights. The display 116 can include speakers or other audio devices are able to provide information audibly to the user. The display 116 can include any other type of mechanism of functionality that enables the electronic device to provide information to the user. The electronic device 100 can also provide information to the user by transmitting information to an electronic device wirelessly coupled to the electronic device 100 so that the other electronic device can display the information to the user.

Returning to the learning module 110, the sensor processing unit 106 can utilize the learning module 110 to learn a motion or activity of the user. Motions or activities that can be learned can include hand or arm gestures, sign language gestures, weightlifting exercises, cardiovascular exercises, sports, running, cycling, or other types of motions or activities. As an example, the learning module 110 can learn to recognize bicep curls, pull-ups, push-ups, pulldowns, jumping jacks, squats, triceps extensions, or other types of strength training exercises. As will be described in further detail below, after learning selected activities or motions, the sensor processing unit can automatically recognize or infer when the user is performing such actions.

In one embodiment, the user can provide, via the user inputs 114, an indication that the user would like the sensor module 102 to learn a new activity or motion. The sensors 104 generates sensor data while the user performs the activity or motion. The learning module 110 records and processes the sensor data. The learning module 110 learns characteristics of the motion or activity by processing the sensor data collected during the motion or activity. The learning module 110 can utilize unsupervised machine learning processes to learn the new activity or motion based on the sensor data.

In one embodiment, the learning module 110 generates a template for the new activity or motion. In particular, the learning module 110 processes the sensor data utilizing one or more unsupervised machine learning processes to generate a template based on the sensor data. The template can include a heat map. The heat map can include a distribution of inertial sensor data values that characterize the motion or activity. In one embodiment, the benefit of a heat map template is that the timing or sequence of the inertial sensor data values associated with the activity may not be taken into account. This results in templates that take up very little memory while enabling recognition of the activity or motion in the future.

The sensor processing unit 106 can include template data 112. The template data can be stored in memory and can include a plurality of templates. Each template corresponds to a different activity or motion that has been learned by the learning module.

In one embodiment, the sensor processing unit 106 may be preloaded with a plurality of learned activities. The learning module 110 can be configured to fine-tune the preloaded learned activities based on sensor data. In particular, as the user wears, holds, or carries the electronic device 100, the sensor processing unit 106 can recognize when the user is likely performing a preloaded activity and can adjust parameters of the preloaded activity. In this way, the learning module 110 can individualize previously learned or preloaded activities based on specific characteristics of the motion of the user. For example, the learning module 110 can adjust preloaded or previously learned templates based on the sensor data associated with the user.

In one embodiment, the user can provide an input to the electronic device 100 indicating that the user would like the electronic device 100 to learn a new activity or motion of the user. The learning module 110 can receive and analyze sensor data associated with the new activity or motion. The learning model 110 can generate a new template based on the new activity or motion.

In one embodiment, after the user indicates that a new activity or motion should be learned, the learning module 110 can request that the user momentarily remain stationary before beginning the new activity or motion. When the learning module 110 detects that the user has been stationary for a selected duration are selected threshold, the learning module 110 begins recording sensor data associated with the new activity or motion. The learning module 110 can then analyze the new activity or motion and can learn the new activity or motion. Learning an activity or motion can include adjusting parameters of the activity detection module 108. Learning the new activity or motion can include generating a new template or adjusting the previously generated template.

The sensor processing unit 106 includes an activity detection module 108. The activity detection module 108 can include an analysis model trained by the learning module 110 with an unsupervised machine learning process to detect activities or motions of the user. The activity detection module 106 can continuously or periodically analyze sensor data from the sensor 104 in order to determine if the sensor data corresponds to one of the activities previously learned by the learning module 110. If the activity detection module 108 detects or infers that the user is performing a previously learned activity or motion, then the activity detection module 108 can generate an output indicating that the user is performing the previously learned activity or motion.

In one embodiment, the activity detection module 108 corresponds to a classifier model. In particular, the activity detection module 108 can correspond to a classifier that analyzes sensor data and outputs a classification based on the sensor data. The activity detection module 108 can output one of a plurality of classes. The activity detection module 108 can have a class for each learned activity or motion. The activity detection module 108 can also have a class indicating that the sensor data does not correspond to any of the previously learned activities or motions. Accordingly, in one embodiment, if there are n learned activities, the activity detection module 108 may have n+1 possible classifications because there is a classification for each of the n learned activities and an additional classification indicating that the sensor data does not match any of the previously learned activities.

The activity detection module 108 may correspond to an algorithm implemented with processing and memory resources of the sensor processing unit 106. The algorithm may be generated, adjusted, or updated by the learning module 110. The algorithm may be preloaded in the sensor processing unit 106. The algorithm may then be updated or adjusted by the learning module 110.

In one embodiment, when the activity detection module 108 outputs an indication that current sensor data does not correspond to any previously learned activity or motion, then the learning module 110 can automatically learn the new activity or motion. In particular, the learning module 110 can process the sensor data and can adjust the activity detection module 108 with an unsupervised machine learning process to detect the new activity or motion. Learning the new activity or motion may include generating a new template. Accordingly, the learning module 110 can train the activity detection module 108 to recognize a new activity or motion without any input from the user.

In one embodiment, the activity detection module 108 infers that the user is performing one of the learned activities by comparing a template generated using new sensor data to the templates in the template data 112. Such a comparison can include generating a temporary template based on the new sensor data and comparing the temporary template to the template stored in the template data 112. If the new template matches any of the previously generated templates within a threshold tolerance, then the activity detection module 108 can infer that the user is performing the action corresponding to the matched template.

In one embodiment, the sensor processing unit 106 includes a repetition counter. In particular, when the activity detection module detects or infers that the user is performing a previously learned motion, the repetition counter can count the number of times that the motion is performed. For example, if the activity detection module 106 determines that the user is performing bicep curls, the repetition counter can count the number of bicep curls performed by the user. In one embodiment, the repetition counter is part of the activity detection module 108. Alternatively, the repetition counter can correspond to separate circuitry of the sensor processing unit 106. Further details regarding the repetition counter will be provided further below.

In one embodiment, the electronic device 100 includes processing, memory, and communication resources other than the sensor module 102. The electronic device 100 may implement one or more software applications. The one or more software applications can include an exercise tracking application. The exercise tracking application can communicate with the sensor module 102. For example, when the sensor module 102 recognizes that the user is performing a previously learned activity or motion, the sensor module 102 can output data to the exercise tracking application indicating that the user is performing the previously learned activity or motion. The sensor module 102 can also provide repetition counting data or other activity tracking data to the exercise tracking application. The exercise tracking application can then make a recording utilizing the data from the sensor module 102. The exercise tracking application can then output data to the user.

In one embodiment, the sensor module 102 utilizes very little memory and processing resources. For example, the entire activity detection module 108 and the learning module 110 can be implemented with less than 10 KB of SRAM and less than 30 kB of flash RAM. This is significantly less than traditional sensor unit step may utilize more than 65 kB of SRAM and 500 kB of flash RAM.

Furthermore, the activity detection algorithm can modify information about existing motion primitives according to user motion characteristics. This makes the algorithm robust to domain shifts across users. Other possible solutions are static and lack on-device training capabilities.

As set forth previously, the sensor module 102 is able to add new action primitives using unsupervised learning. Other possible solutions bind the user to a limited set of activities and application settings. An algorithm in accordance principles of the present disclosure may be utilized without information provided from the user about start times and end times of an activity. The algorithm may be utilized without label data (supervised training). Other possible solutions burden the user to provides target and then start and end times of the activity during training. Nevertheless, in one embodiment the sensor module 102 can also utilize user provided start and end times for activity training if desired. As set forth previously, the algorithm can include a repetition counter within an adaptive hyper parameter that can accurately detect peaks on-the-fly for various motion primitives without user input. The algorithm may be fully unsupervised without any user supplied parameters during training.

In one embodiment, the training utilizes activity segmentation. The user may inform the sensor unit that a new motion or template is to be added to the template data 112. The sensor processing unit 106 enters the training mode. The sampling frequency (output data rate) of the sensor 104 is set. The user is asked to remain static for a selected period of time before beginning the motion or activity. The stationary state is detected when the sum of rolling variance across inertial sensor axes is less than a selected threshold. If a stationary state exceeds the selected period of time, the collection of sensor data is started. If data collections are completed within a selected data collection period of time, data collection is canceled. In the data collection phase, if the static postures detected for a duration longer than the maximum static posture value, data collection is stopped and the data collected before the static posture started is stored in the buffer. Otherwise, a selected duration of sensor data is written to a buffer. If the entire segmentation takes longer than a maximum segmentation threshold, then the segmentation phase is canceled. In one embodiment, template creation may be calculated from x, y, and z accelerometer data which may be stored in a buffer. In particular, roll and pitch may be calculated from the accelerometer data which may be stored in a buffer. Roll may be calculated with the following relation:

$$Roll_t = \arctan 2(A_{yt}, A_{zt}),$$

where $A_{xt}$, $A_{yt}$ and $A_{zt}$ are accelerometer measurement values for the x, y, and z axes of one or more accelerometers of the sensors 104 at a particular time. Pitch may be calculated with the following relation:

$$Pitch_t = \arcsin\left(\frac{A_{xt}^2}{\sqrt{A_{xt}^2 + A_{yt}^2 + A_{zt}^2}}\right).$$

The gravity vector direction ($x_t$, $y_t$, and $z_t$) for three axes are extracted from the roll and pitch in the following manner:

$$x_t = \sin(Pitch_t), y_t = \cos(Pitch_t)\sin(Roll_t), z_t = \cos(Pitch_t)\cos(Roll_t).$$

The variance of x, y, and z are calculated. The two axes with maximum variance are chosen for the next phase. A m×m byte grid is then created. A m×m matrix is created such that if the matrix is plotted as an image, it would look the same as an image of the two chosen axes plotted against each other. The m×m byte grid, along with the name of the two axes with maximum variance, is written to the flash memory of the sensor processing unit. This corresponds to the template for that specific activity or motion. In one example, a real time operating system (RTOS) in the sensor processing unit 106 maintains a file system to store a certain number of templates. In other examples, the sensor processing unit 106 can manage storage of templates in other ways.

In one embodiment, when the activity recognition unit 108 performs inference or recognition of an activity, a selected number of seconds worth of accelerometer data is stored in the buffer. A temporary template is generated from the accelerometer data in the same manner that a template is generated during learning, except that the temporary template is not permanently stored and is only used for comparison against other templates to perform inference or recognition. Those stored templates whose two axes coincide with the axes of maximum variance of the temporary template are loaded one by one. A similarity metric (universal image quality) is calculated between the temporary template and the stored templates. The stored template for which the similarity metric x of the temporary template y is maximum is selected as the class of the inference template. The similarity metric Q can be given with the following relationship:

$$Q = \frac{4 \cdot \sigma_{xy} \cdot \bar{x} \cdot \bar{y}}{(\sigma_x^2 + \sigma_y^2) \cdot (\bar{x}^2 + \bar{y}^2)}$$

where $\sigma_x^2$ is the variance of original image x, $\sigma_y^2$ is the variance of original image y, and $\sigma_{xy}$ is the cross variance between x and y.

A peak detector is then activated, which counts the number of repetitions in the current window. The peak detector identifies a point as a peak if it has the maximal value and was preceded to the left by a value lower by DELTA. The peak detector operates on the accelerometer axis u[ ] which has maximum variance out of x, y and z. DELTA is adapted on the fly as follows:

$$\Delta = \text{var}(u[\,]) \times \frac{ptile(u[\,], 0.95) - \min(u[\,])}{2 \times \text{var}(u[\,])}$$

If the activity in the current window matches the class of the activity in the previous window, the global rep counter is incremented by the number of peaks detected in the current window otherwise, the global rep counter is restarted. Accordingly, the repetition counter may be considered part of the activity detection module 108. Alternatively, the repetition counter may be implemented and other circuitry of the sensor processing unit 106.

While descriptions herein primarily address a sensor unit that utilizes unsupervised learning to recognize actions of a user, principles of the present disclosure extend to learning other types of activities. For example, the sensor module can be coupled to an electronic device such as a machine or vehicle. The sensor module 102 can utilize unsupervised learning to learn one or more operational modes of the machine utilizing principles described above. This can be utilized to detect when the machine is operating anomalously or to merely detect the current operational mode of the machine.

In one embodiment, the machine includes one or more moving parts or is a machine that otherwise moves during its operation. The machine can include an industrial machine, a machine that moves material from one location to another, or a machine that processes material, a vehicle, or other types of machines or devices. In one embodiment, the machine can include a household appliance such as a coffee maker, a washing machine, a dryer, a dishwasher, a mixer, a blender, a microwave oven, or other types of machines. Moving parts can include a fan, a motor, a servo, wheels, or other types of moving parts. Principles of the present disclosure can also extend to machines or electronic devices that do not include moving parts.

In one embodiment, the machine includes one or more standard operating modes. The machine may operate in the various operating modes at different times. For example, an industrial machine may have a material receiving mode in which material is loaded into the industrial machine. The industrial machine may have a transport mode in which the industrial machine moves material from one location to another on a track. The industrial machine may have a rotational load in which the industrial machine performs a rotation. The industrial machine may operate in any of these modes at different times. Each of these modes may have characteristic movements. As another example, a blender may operate in a plurality of modes such as a puree mode, a smoothie mode, various blending speed modes, or other types of modes. The blender as a whole, or the blender's moving parts may have different characteristic motions in the various operating modes.

During the lifetime of the machine, the machine may deteriorate or breakdown. For example, a moving part within the machine may begin to deteriorate. Often times such deterioration is not noticeable until a serious breakdown occurs. The breakdown may ruin expensive parts or may entirely ruin the machine. It is beneficial to detect deterioration before serious damages done. Such detection can enable inspection, maintenance, or repair before serious damage or destruction can occur.

Deterioration of a machine may manifest in slight changes in the motion of the machine or the motion of moving parts in the machine. For example, a motor may rotate more slowly, normally smooth motion may become rough or jittery, or other phenomenon may occur that is difficult to detect with human senses. Replacing machines with a machine that comes pre-equipped with an expensive sensing device may be cost prohibitive or otherwise unfeasible.

Using principles described above, the sensor module 102 is able to detect anomalous behavior of the machine and output a warning or other indication that the machine should be inspected. The sensor module highly sensitive and can detect very small changes in operation. The small changes in operation may be indicative of deterioration of the machine or imminent breakdown. The sensor unit is able to detect such small variations long before they would be apparent to human senses. When the sensor unit 102 outputs a warning or indication of anomalous behavior, technicians can inspect the machine and can perform maintenance, repair, or part replacement before serious damage is done to the machine.

Accordingly, throughout the description, when reference is made to learn a new activity of a user, such principles extends also to learning operational modes of machines or vehicles. Furthermore, principles of the present disclosure can be utilized to recognize hand gestures in AR/VR applications, fall detection in healthcare applications, or other types of activities or operations associated with an electronic device.

FIG. 2 is a block diagram of a sensor module 102, according to one embodiment. The sensor module 102 of FIG. 2 is one example of a sensor module 102 of FIG. 1. The sensor module 102 includes one or more sensors 104. The one or more sensors 104 can include one or more inertial sensors such as accelerometers, gyroscopes, or other types of sensors.

The sensor module 102 may include one or more digital signal processors (DSP) 120. The DSP 120 may be in an ASIC associated with the sensors 104. Alternatively, the DSP 120 may be part of a sensor processing unit 106. The DSP can convert analog sensor signals to digital sensor signals and can otherwise condition the sensor signals for processing by a sensor processing unit 106.

The sensor module 102 may include processing resources 122. The processing resources 122 can include one or more microcontrollers, one or more microprocessors, one or more ISPUs, or other types of processing resources. In one embodiment, the processing resources 122 correspond to a low power, low area microcontroller.

The sensor module 102 includes memory resources 124. The memory resources 124 can include one or more buffers, registers, SRAM arrays, DRAM arrays, flash memory arrays, or other types of memory that can store data and that can be read by the processing resources 122. The memory resources 124 may store software instructions for implementing functionality of the sensor module 102 including the sensor processing unit 106. The memory resources 124 may store data corresponding to an algorithm or analysis model associated with the learning module 110 and the activity detection module 108. The memory resources 124 may store one or more templates associated with a learned activity or motion. The memory resources 124 may store one or more temporary templates associated with sensor data utilized for inferring or classifying the sensor data as corresponding to one of the learned activities.

The sensor module 102 may include communication resources 126. The communication resources 126 can include circuitry for transmitting signals or data between components of the sensor module 102, between the sensor module 102 and components of the electronic device 100, or between the sensor module 102 and a device external to the external device. Accordingly, the communication resources 126 may include circuitry protocols for wired transmission, wireless transmission, or other types of transmissions.

The sensor module 102 includes a learning module 110. The learning module 110 can correspond to an algorithm implemented with the processing resources 122 and the memory resources 124. In particular, the learning module 110 may be implemented by the processing resources 122 executing instructions stored in the memory resources 124. The learning module 110 may perform actions described in relation to FIG. 1. In particular, the learning module 110 may utilize unsupervised machine learning processes to learn motions or activities of a user of the electronic device 100.

The sensor module 102 may include an activity detection module 108. The activity detection module 108 can correspond to an algorithm implemented with the processing resources 122 and the memory resources 124. In particular, the activity detection module 108 may be implemented by the processing resources 122 executing instructions stored in the memory resources 124. The activity detection module 108 may correspond to a classifier or other type of analysis model that analyzes sensor data and classifies the sensor data as corresponding to one of the learned activities or motions.

Although the activity detection module 108 and the learning module 110 are illustrated as separate modules, in practice, the activity detection module 108 and the learning module 110 may be a single module or algorithm. The learning module corresponds to the algorithm generating new templates based on sensor data. The activity detection module 108 corresponds to the algorithm generating temporary templates based on the sensor data and matching the temporary templates to previously stored templates. The algorithm may also count repetitions as described previously.

The sensor module 102 includes template data 112. The template data 112 may correspond to previously in generated templates. The template data 112 may be stored in the memory resources 124. In one embodiment, the template data 112 is stored in a flash memory of the memory resources 124. The sensor module 102 may include other components and other arrangements of components than shown in FIG. 2, without departing from the scope of the present disclosure.

FIG. 3 is a flow diagram of a method 300 for operating a sensor unit, according to one embodiment. The method 300 can utilize components, systems, and processes described in relation to previous and subsequent figures. The method 300 may be utilized for a learning operation of a sensor processing unit. In particular, the method 300 may be utilized to learn a new activity or motion for a user of an electronic device that includes the sensor processing unit.

At 302, activity segmentation is performed. Activity segmentation can include receiving from the user, a request to learn a new activity. The sensor unit may prompt the user, via a display of an electronic device, to remain stationary for a selected duration of time before beginning the motion activity. After the selected duration of time, the sensor unit may store sensor data associated with the activity in a buffer. Activity segmentation can also include prompting the user to begin the activity after the selected period of stationary time has been fulfilled.

At 304, the sensor unit generates a template based on the sensor data. The sensor unit can generate the template by processing the sensor data as described in relation to FIG. 1. Creation the template may utilize very small amounts of processing resources and the template may correspond to a very small amount of memory. At 306, the sensory that stores the template memory. This can correspond to writing the template to a flash memory of the sensor unit.

FIG. 4 is a flow diagram of a method 400 for operating a sensor unit, according to one embodiment. The method 400 can utilize components, processes, and systems described in relation to previous and succeeding figures. The method 400 corresponds to a method for collecting sensor data for generating a new template. For example, the method 400 can be performed by a learning module of a sensor processing unit in response to a request from a user to learn a new motion or activity.

At 402, static detection is performed. Static detection can be performed in response to receiving a request from a user to learn a new motion or activity. Static detection can include determining whether or not current sensor data indicates a sufficiently low amount of motion. Accordingly static detection can correspond to detecting whether or not the electronic device of stationary. At 404, if a static condition is not detected, then the process proceeds to 410. At 404, if a static condition is detected, then the process proceeds to 406. At 406, the amount of time for which the electronic device 100 has remain stationary is updated. At 408 the sensor processing unit determines whether or not the user has remains stationary for the selected duration of time. If the user has not remain stationary for the selected duration of time, then the process proceeds to 410. At 410, it is determined whether or not the process has timed out. At the process is not timed out, then the process returns to 402. If the process has timed out, then the process is canceled at 422.

At 412, static detection is again performed. At 414, if a static condition is detected, then the process proceeds to 416. The static condition is not detected, then the process proceeds to 424. At 416, the duration of the stationary state is updated. At 418, the sensor processing unit determines whether or not the user has been static for too long (i.e., for a duration greater than a maximum static duration). If the static condition has not gone too long, the process proceeds to 426. If the static condition has gone too long, the process proceeds to 420.

At 426, the sensor processing unit determines whether or not the sensor data buffer is full. If the sensor data buffer is not full, then at 428 the sensor data is stored in the buffer. At 426, the sensor buffer is full, then the process returns the sensor buffer at 430. At 430, the sensor data can be utilized for generating the new template. At 428, the process proceeds to 412. At 420, if the buffer time is sufficient (i.e., there is sufficient sensor data to generate a template) then the process proceeds to 430. At 420, if there is not sufficient sensor data, then the process is canceled at 422. The process 400 can utilize other steps or combinations of steps without departing from the scope of the present disclosure.

Figure 5:
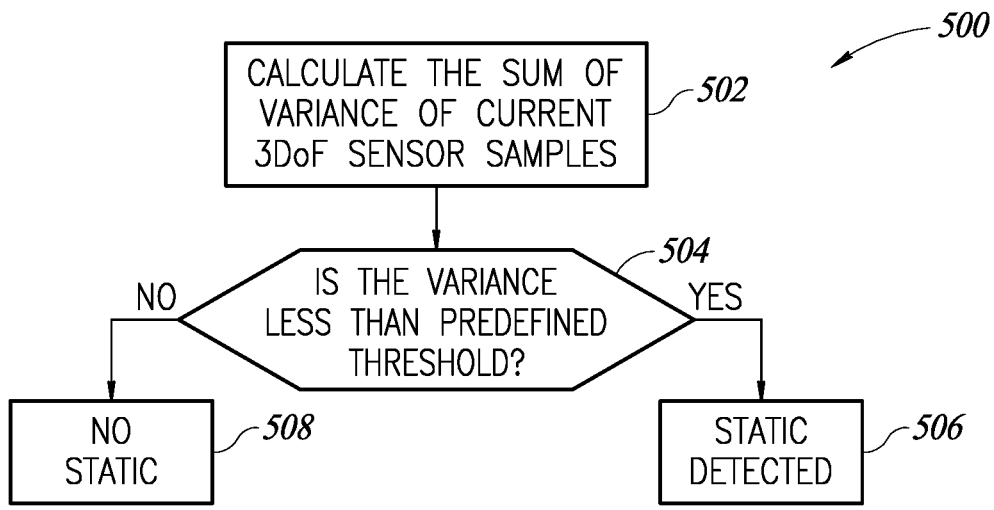
FIG. 5 is a flow diagram of a method for detecting whether an electronic device is stationary, according to one embodiment.

FIG. 5 is a flow diagram of a method 500 for operating a sensor processing unit, according to one embodiment. The method 500 can utilize processes, components, and systems described in relation to previous and succeeding figures. The method 500 can be utilized for determining whether or not a static or stationary condition is present.

At 502, the sensor processing unit calculates the sum of the variance of current sensor data. In particular, for a three axis accelerometer, the sum of the variance for the sensor data of all three axes is calculated. At 504, the sensor processing unit determines whether or not the variance is less than a predefined threshold. At 506, if the variance is less than the predefined threshold, then the static or stationary condition is detected. At 508, if the variance is not less than the predefined threshold, then the static or stationary condition is not detected.

Figure 6:
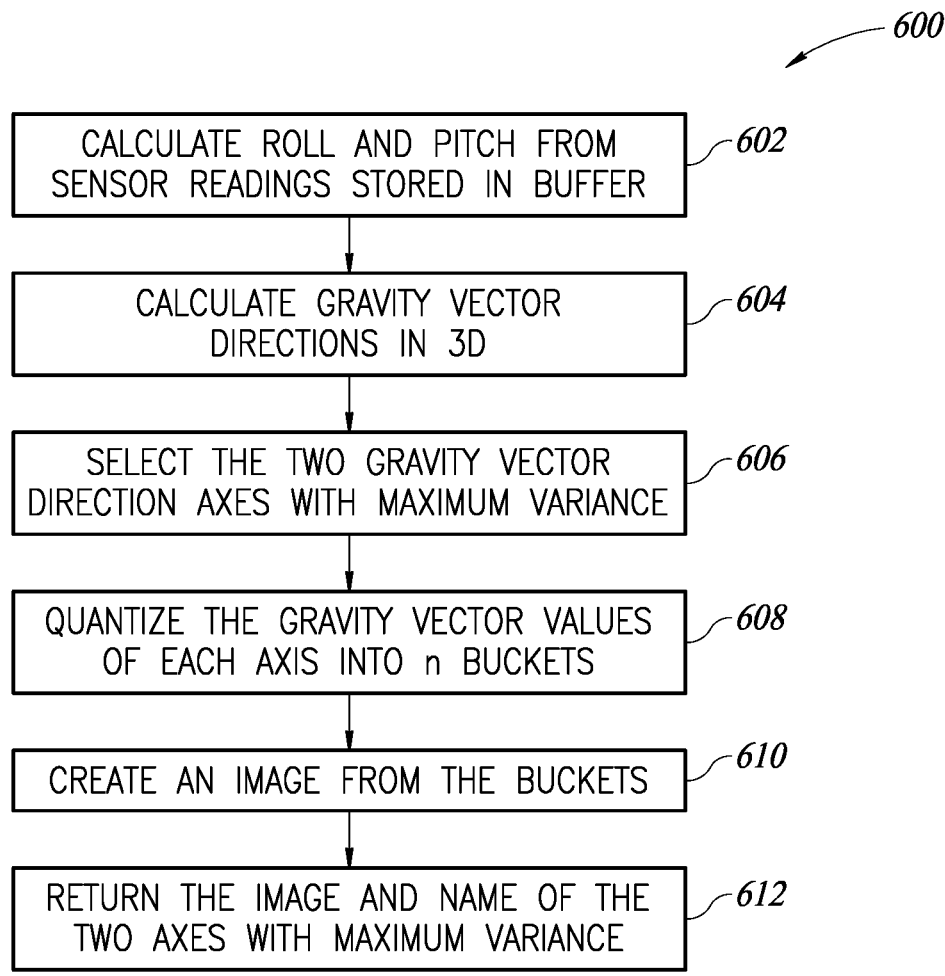
FIG. 6 is a flow diagram of a method for operating a sensor unit of an electronic device, according to one embodiment.

FIG. 6 is a flow diagram of a method 600, according to one embodiment. The method 600 can utilize processes, components, and systems described in relation to previous and succeeding figures. The method 600 can be utilized to create a template for learning a new activity or for creating a temporary template for classifying or inferring an activity.

At 602, the sensor processing unit calculates the role invention from sensor data stored in the buffer. The roll and pitch can be calculated as described in relation to FIG. 1. At 604, the sensor processing unit calculates the gravity vector directions in all three dimensions. The gravity vector directions can be calculated as described in relation to FIG. 1. At 606, the sensor processing unit selects the two gravity vector direction axes with maximum variance. At 608, the sensor processing unit quantizes the gravity vector values of each axis into n buckets. In other words, the gravity vector values can have n possible values after quantization. Each gravity vector values quantized and the signed to one of the n possible values. At 610, and image is created from the buckets or possible values. At 612, the image and name of the two axes with maximum variance are returned. This can correspond to creation of a template.

Figure 7:
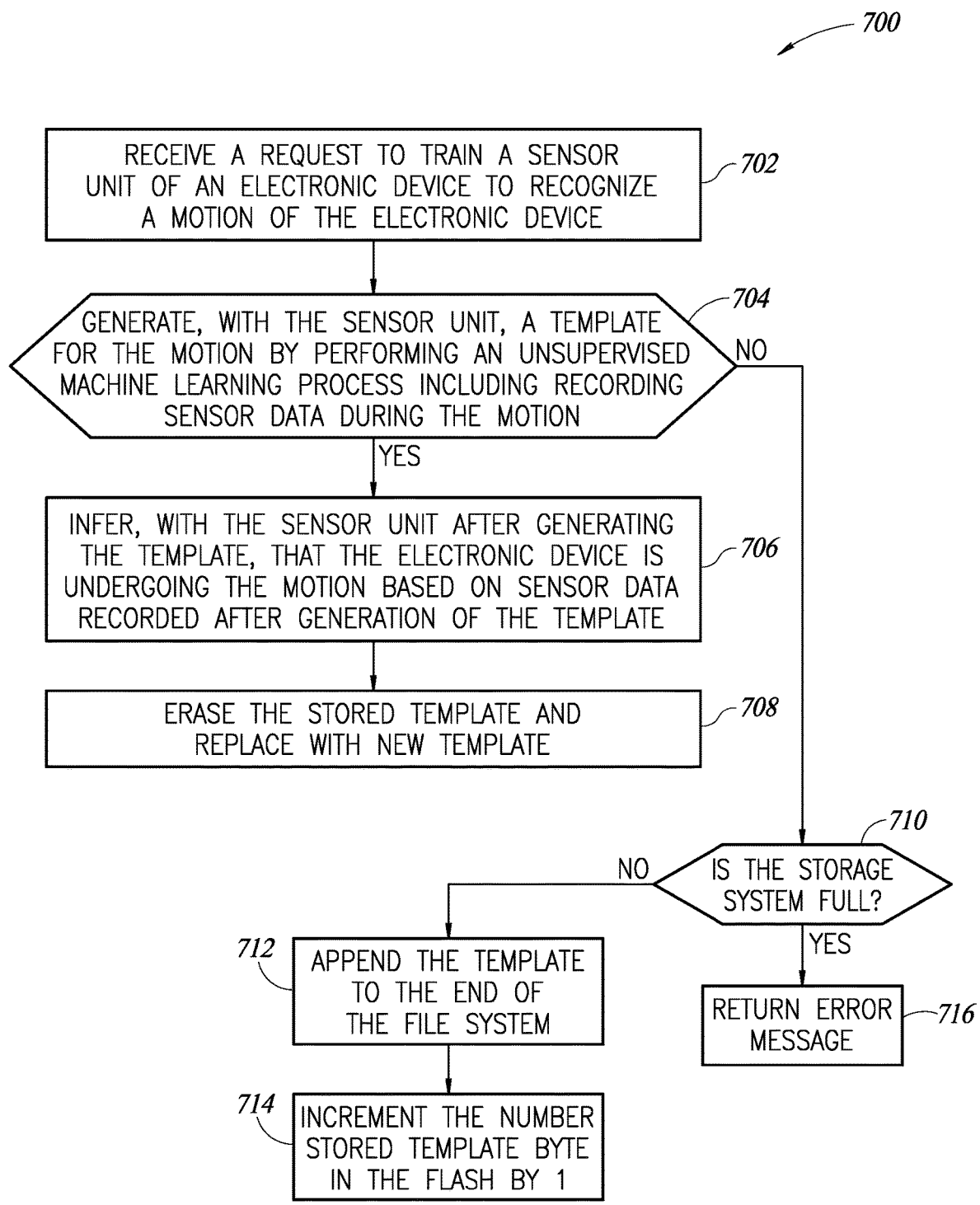
FIG. 7 is a flow diagram of a method for operating a sensor unit of an electronic device, according to one embodiment.

FIG. 7 is a flow diagram of a method 700 for operating a sensor processing unit, according to one embodiment. The method 700 can utilize processes, components, and systems described in relation to preceding and succeeding figures. The method 700 can be utilized for storing a template.

At 702, a template is received for storage. At 704, the sensor processing unit determines whether or not the template is to replace an existing template (i.e., a previously stored template). If the template is to replace an existing template, then at 706 the index of the template to be replaced is retrieved. At 708, the corresponding template is erased and replaced with the new template.

If the template is not to replace existing template, then at 710 the sensor processing unit determines whether or not the template storage system is full. If the template storage system is full, then at 716 an error message is returned. The error message may indicate that an existing template should be erased to store another template. If the storage system is not full, then at 712 the new template is appended to the end of the template storage file system. At 714, the number of a stored template bite in the flash memory is incremented by 1.

Figure 8:
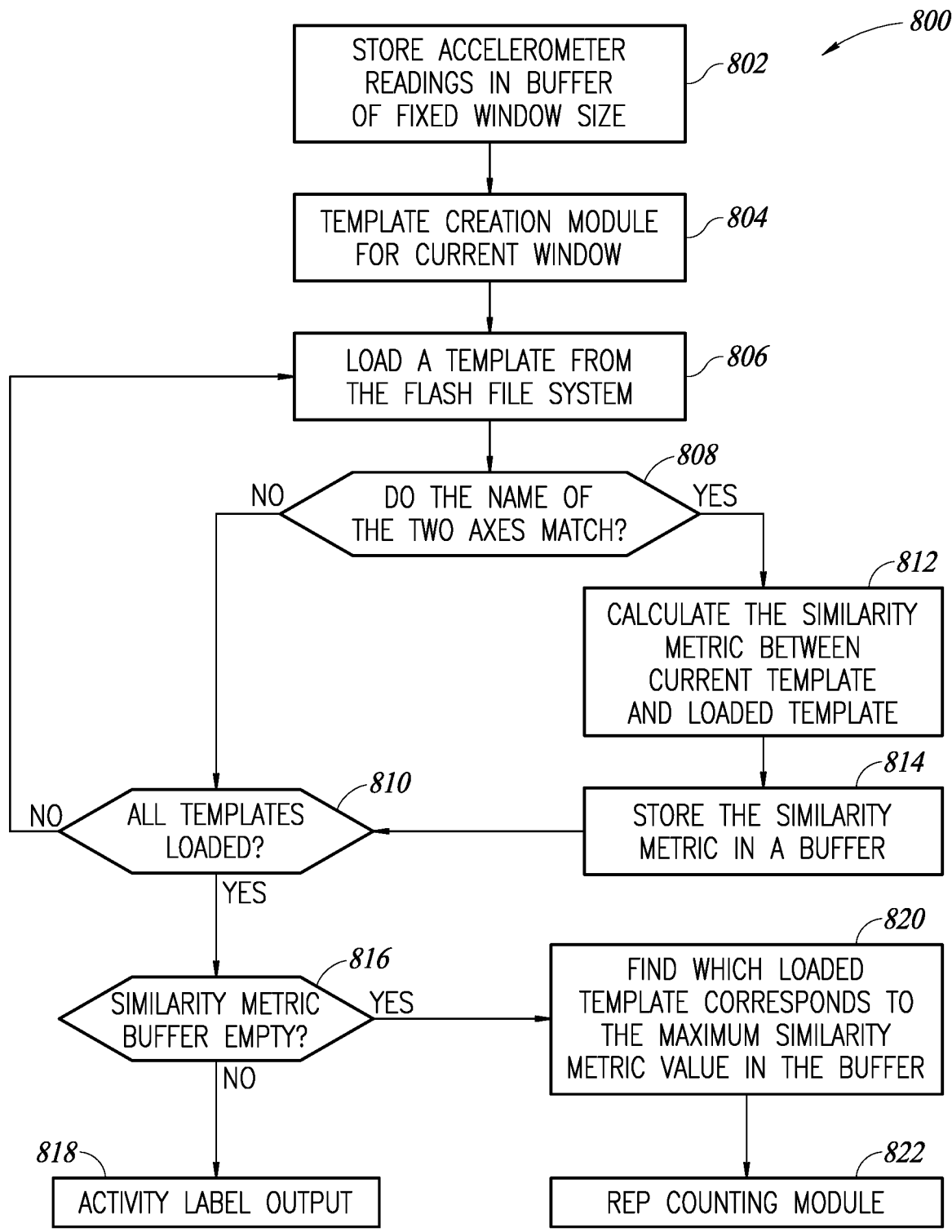
FIG. 8 is a flow diagram of a method for operating a sensor unit of an electronic device, according to one embodiment.

FIG. 8 is a flow diagram of a method 800 for operating a sensor processing unit, according to one embodiment. The method 800 can utilize systems, components, and processes described in relation to previous and succeeding figures. The method 800 can be utilized to perform inference or classification of an activity or motion of a user.

At 802, accelerometer sensor data is stored in the buffer of a fixed window size. In other words, the buffer stores a selected number of sensor data samples. As the sensor data sample at a particular rate, the window size corresponds to a duration of time based on sampling rate. At 804, a temporary template is created for the current window of sensor data. The temporary template can be created in the same manner as the template stored during learning. The temporary template the stored in the SRAM, whereas templates created during learning are stored in flash, in one embodiment. At 806, the method 800 loads a template from the flash file system. At 808, the sensor processing unit determines whether or not the name of the two axes of the temporary template match the name of the two axes in the loaded template from flash. If the names of the axes do not match, then at 810, the sensor processing unit determines whether or not all templates have been loaded. At 810, if all templates have not been loaded the process returns to 806. At 810, if all templates have been loaded the process proceeds to 816. At 808, if the name of the two axes of the temporary template match the name of the two axes of the loaded template, then at 812 the sensor processing unit calculates the similarity metric between the current template and the loaded template. At 814 the sensor processing unit stores the similarity metric in a buffer. At 816, the sensor processing unit determines whether or not the similarity metric buffer is empty. If the similarity metric buffer is not empty, then at 820 the sensor processing unit determines which loaded template corresponds to the maximum similarity metric value in the buffer. At 822, the sensor processing unit counts repetitions. If the similarity metric buffer is empty and 816, then at 818 the sensor processing unit outputs the activity label. The activity label corresponds to the classification or inference indicating which previously learned activity is being performed.

Figure 9A:
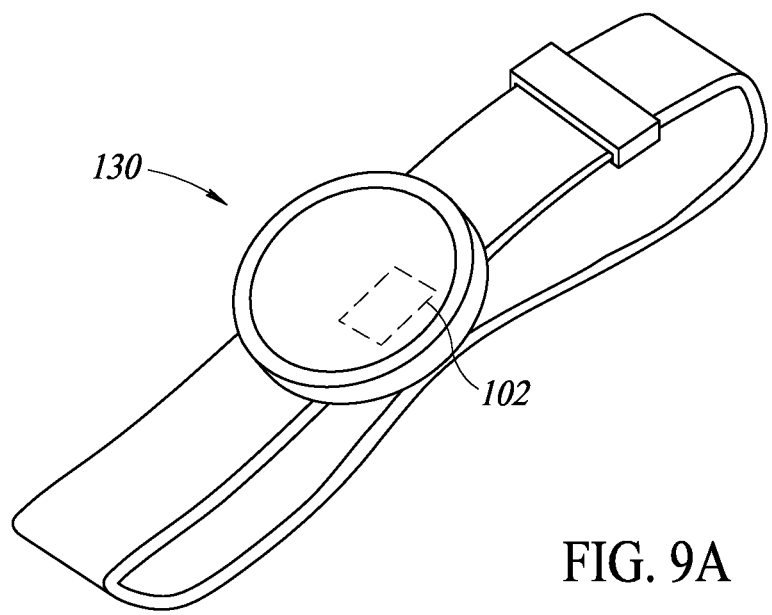
FIG. 9A is an illustration of a wearable electronic device, according to one embodiment.

FIG. 9A is an illustration of a smartwatch 130, according to one embodiment. The smartwatch 130 is one example of an electronic device 100 of FIG. 1. Furthermore, the smartwatch 130 is one example of a wearable electronic device. The smartwatch 130 includes a sensor module 102, as described in relation to previous figures. The smartwatch 130 can be worn on a wrist of the user. As the user performs motions or activities, the sensor unit generates and processes sensor signals. The sensor unit can include an analysis model or algorithm that can be trained to recognize motions or activities of the user and then to make inferences or classifications regarding motions or activities of the user.

Figure 9B:
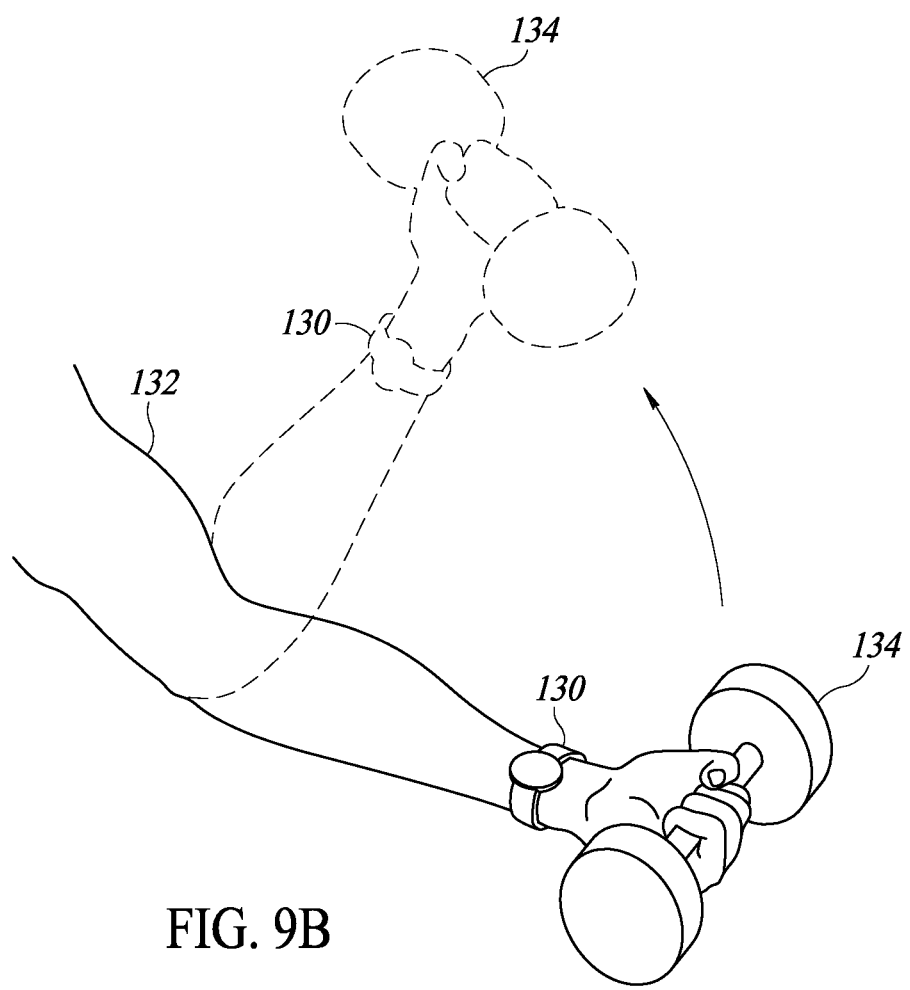
FIG. 9B-9D are illustrations of activities that can be performed while wearing the electronic device of FIG. 9A, according to one embodiment.

FIG. 9B is an illustration of an activity that the smartwatch 130 can be trained to recognize, according to one embodiment. FIG. 9B illustrates the arm 132 of the user holding a dumbbell 134 and performing bicep curls. The sensor unit 102 can be trained with an unsupervised machine learning process to recognize the motion of the bicep curl. The sensor unit 102 can generate a template 900 (shown in FIG. 9E) based on the sensor signals recorded during training.

Figure 9C:
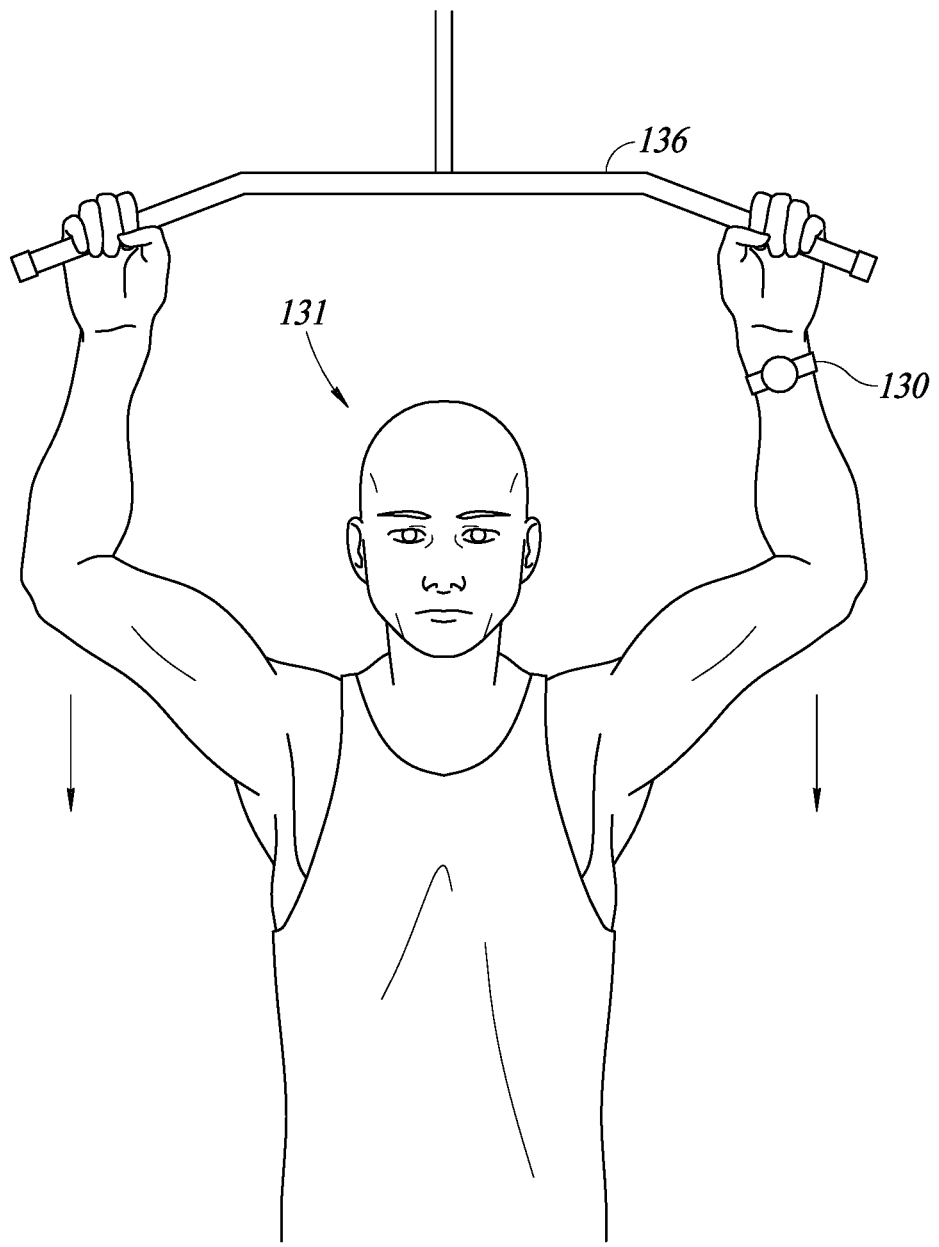

FIG. 9C is an illustration of an activity that the smartwatch 130 can be trained to recognize, according to one embodiment. FIG. 9C illustrates a user performing a pulldown exercise with a bar 136. The sensor unit 102 can be trained with an unsupervised machine learning process to recognize the motion of the pull-down exercise. The sensor unit 102 can generate a template 902 (shown in FIG. 9F) based on the sensor signals recorded during training.

Figure 9D:
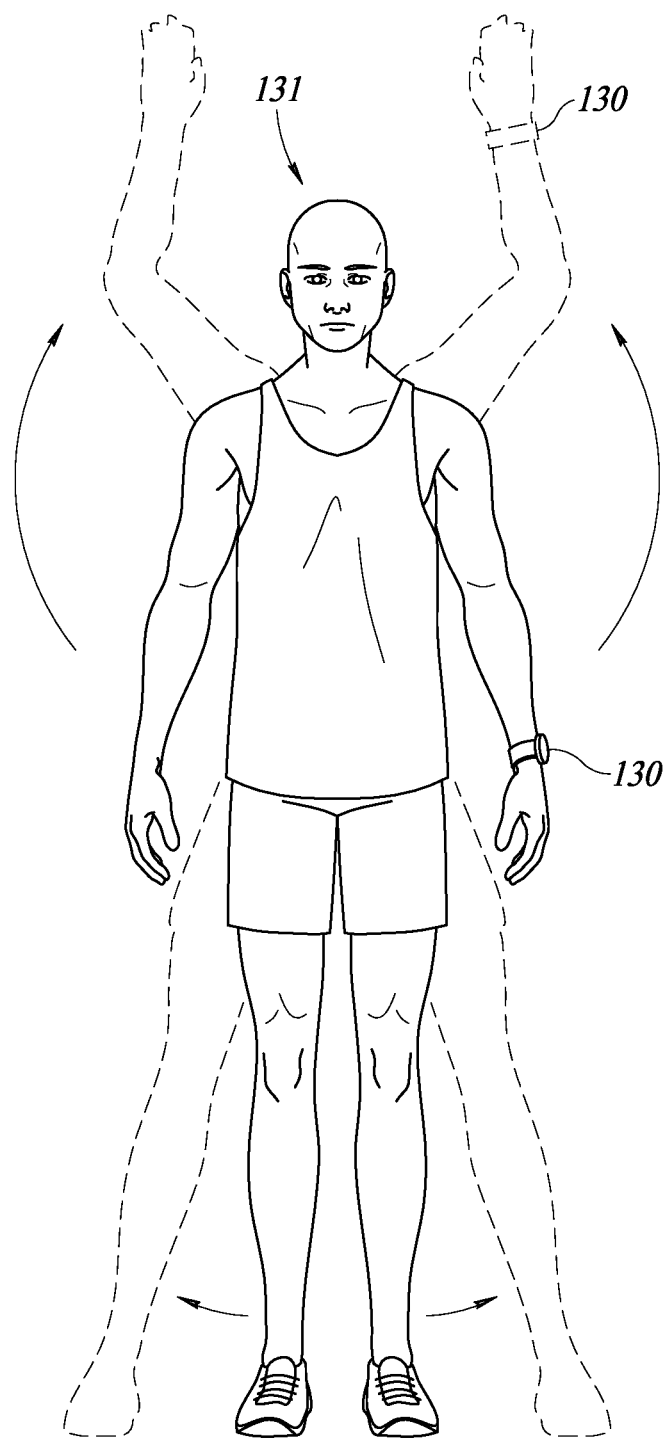

FIG. 9D is an illustration of an activity that the smartwatch 130 can be trained to recognize, according to one embodiment. FIG. 9D illustrates a user performing a jumping jack. The sensor unit 102 can be trained with an unsupervised machine learning process to recognize the motion of the jumping jack. The sensor unit 102 can generate a template 904 (shown in FIG. 9G) based on the sensor signals recorded during training.

Figure 9E:
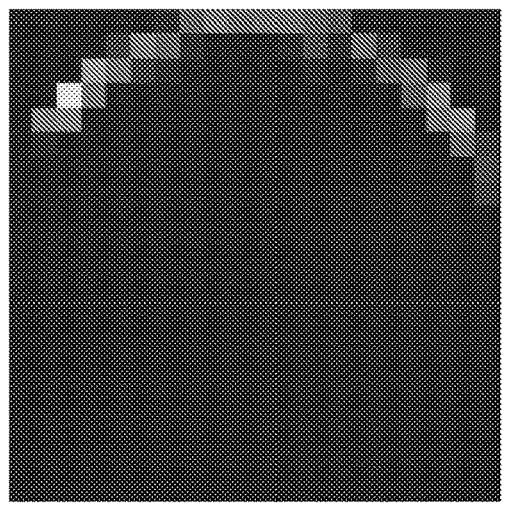
FIGS. 9E-9G are representations of activity templates associated with the activities illustrated in FIGS. 9B-9D, according to one embodiment.
Figure 9F:
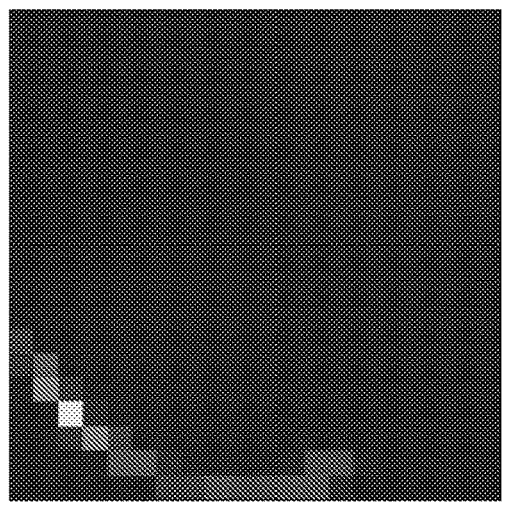
Figure 9G:
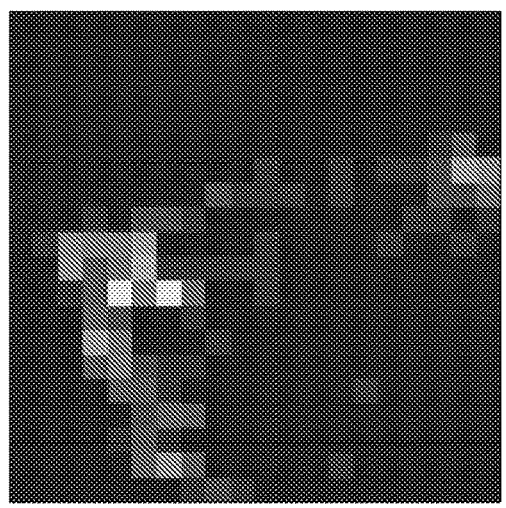

FIGS. 9E-9G are representations of templates 900, 902, and 904 generated during learning for the respective exercises shown in FIGS. 9B-9D. Each template can identify two axes, as described previously. Each template can indicate which buckets (shown as pixels or quadrants) receive sensor data values, as described previously.

Figure 10:
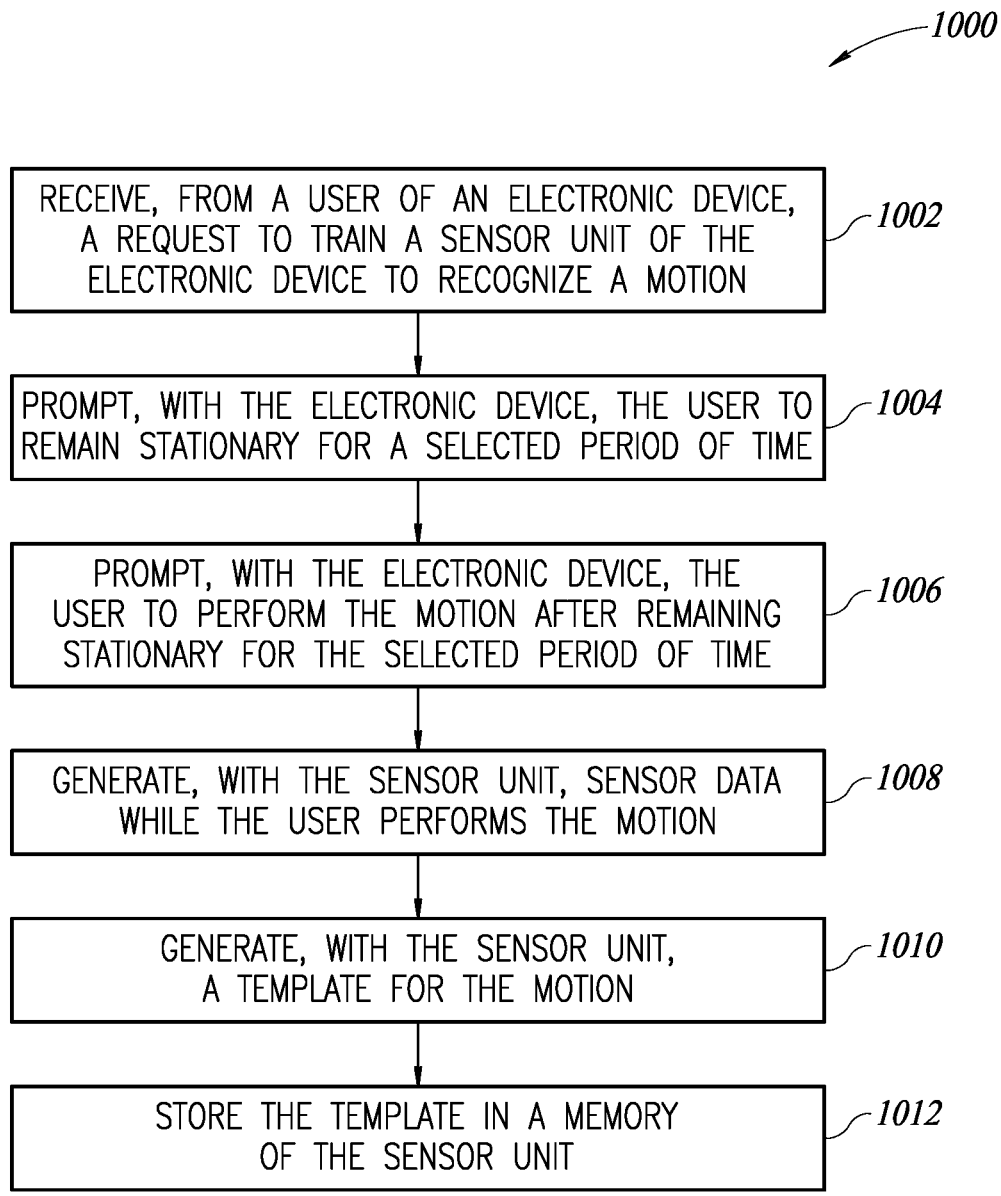
FIG. 10 is a flow diagram of a method for operating a sensor unit, according to one embodiment.

FIG. 10 is a flow diagram of a method 1000 for operating a sensor unit of an electronic device, according to one embodiment. The method 1000 can utilize components, processes, and systems described in relation to previous and succeeding figures. At 1002, the method 1000 includes receiving, with an electronic device, a request from a user to train a sensor unit of the electronic device to recognize a first motion. At 1004, the method 1000 includes prompting, with the electronic device, the user to remain stationary for a selected period of time. At 1006, the method 1000 includes prompting, with the electronic device, the user to perform the first motion after remaining stationary for the selected period of time. At 1008, the method 1000 includes generating, with the sensor unit, sensor data while the user performs the first motion. At 1010, the method 1000 includes generating, with the sensor unit, a first template for the first motion. At 1012, the method 1000 includes storing the first template in a memory of the sensor unit.

Figure 11:
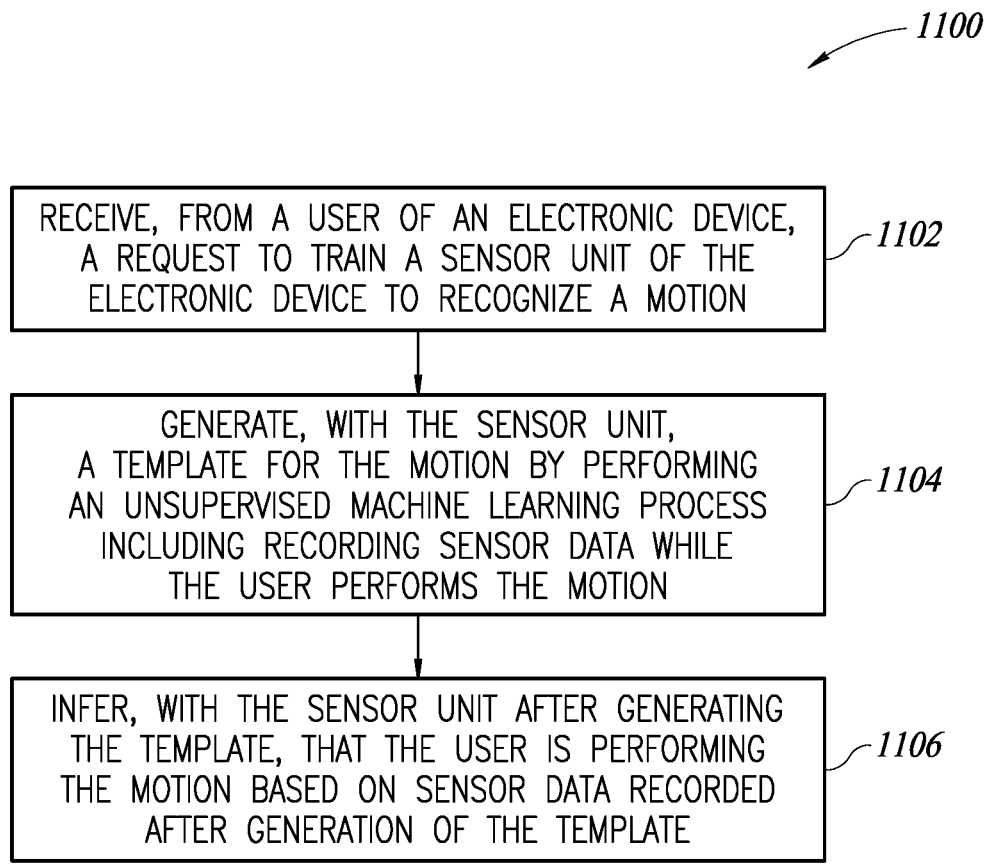
FIG. 11 is a flow diagram of a method for operating a sensor unit, according to one embodiment.

FIG. 11 is a flow diagram of a method 1100 for operating a sensor unit of an electronic device, according to one embodiment. The method 1100 can utilize components, processes, and systems described in relation to previous and succeeding figures. At 1102, the method 1100 includes receiving, from a user of an electronic device, a request to train a sensor unit of the electronic device to recognize a motion. At 1104, the method 1100 includes generating, with the sensor unit, a template for the motion by performing an unsupervised machine learning process including recording sensor data while the user performs the motion. At 1106, the method 1100 includes inferring, with the sensor unit after generating the template, that the user is performing the motion based on sensor data recorded after generation of the template.

Figure 12:
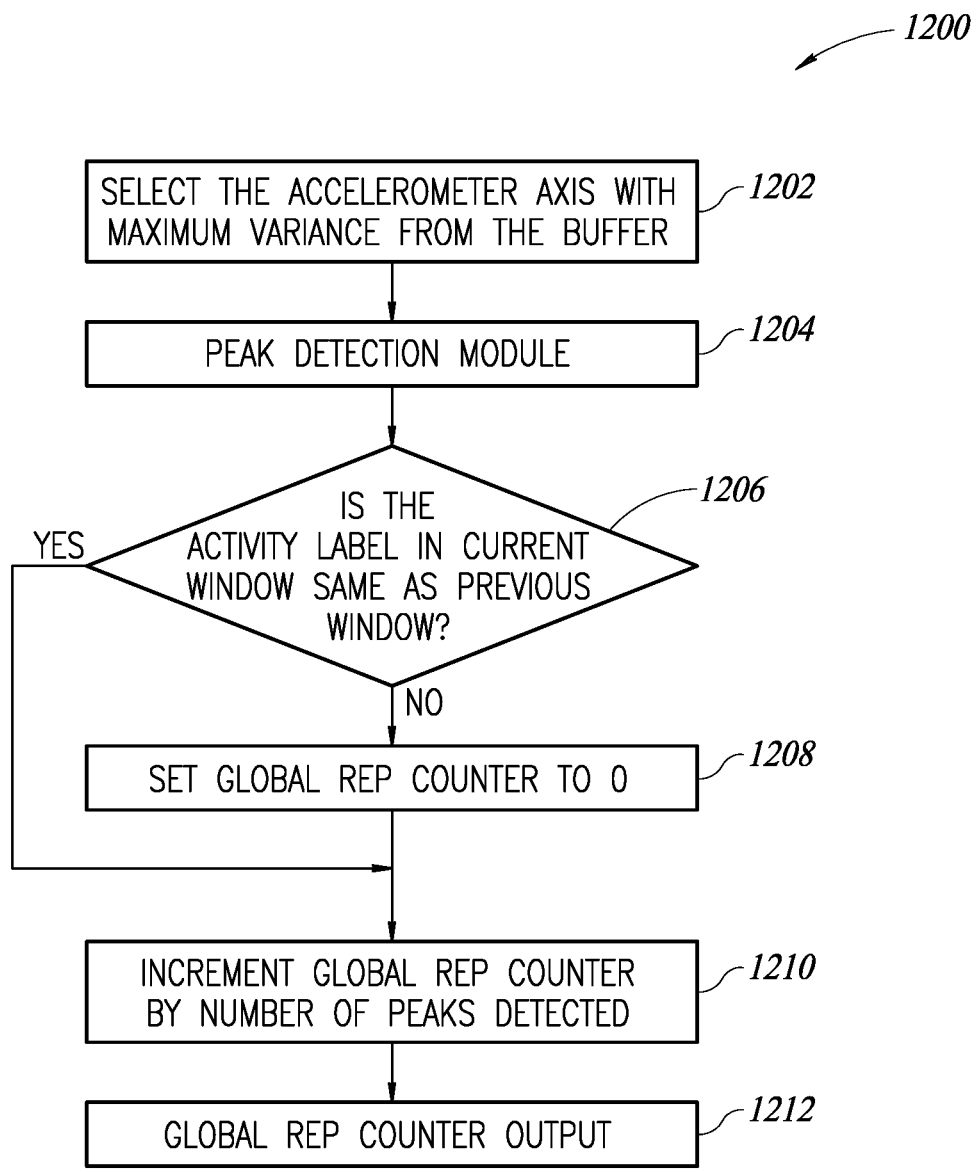
FIG. 12 is a flow diagram of a method for operating a sensor unit of an electronic device, according to one embodiment.

FIG. 12 is a flow diagram of a method 1200 for operating a sensor processing unit, according to one embodiment. The method 1200 can be utilized for repetition counting after inference of an activity. At 1202, the sensor processing unit selects an accelerometer axis with maximum variance from the buffer. At 1204, a peak detection module is activated. At 1206, the peak detection module determines whether the activity label (classification or inference) in the current window is the same as in the previous window. If the activity label is not the same, then at 1208 a global repetition counter is set to zero. If the activity label in the current window is the same as the previous window, then at 1210 the global repetition counter is incremented by the number of peaks detected. At 1212, the global repetition counter value is output. This can include outputting the value to another application of the electronic device or on a display of the electronic device for viewing by a user.

Figure 13:
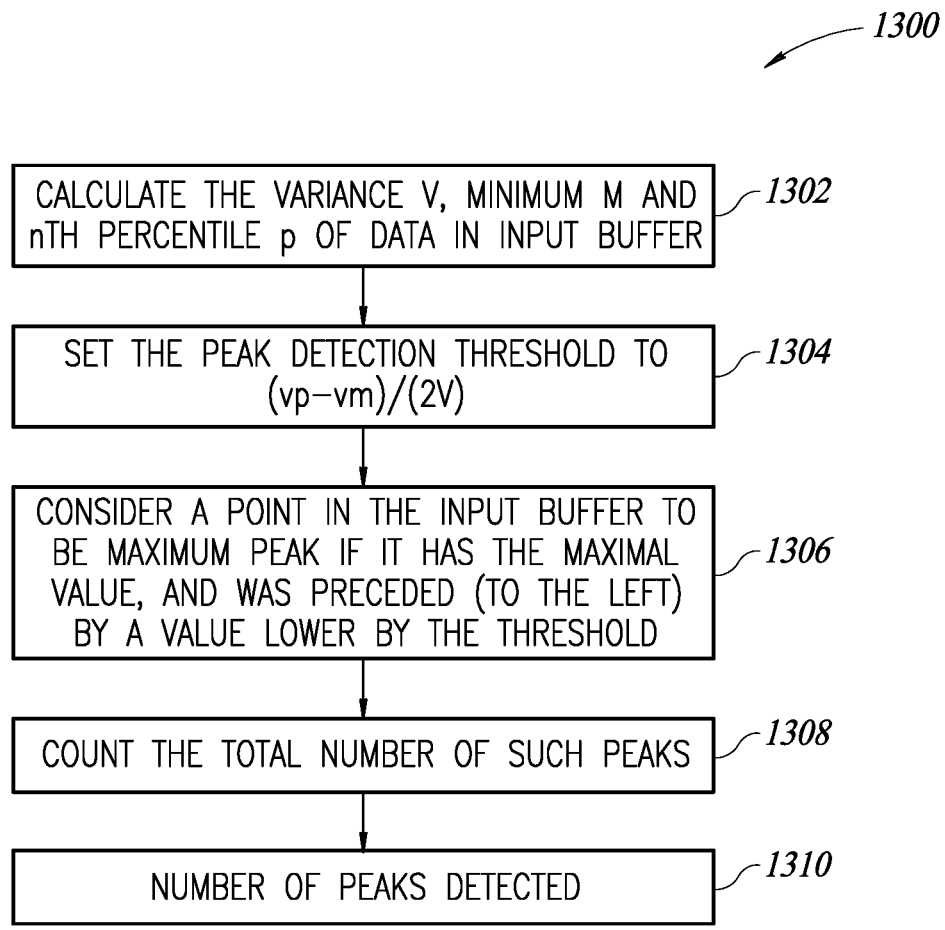
FIG. 13 is a flow diagram of a method for operating a sensor unit of an electronic device, according to one embodiment.

FIG. 13 is a flow diagram of a method 1300 for operating a sensor processing unit, according to one embodiment. The method 1300 can be utilized for operating a peak detection module. At 1302, the variance v, the minimum m, and the nth percentile p of data in the input buffer or calculated. At 1304, the peak detection threshold is set to (Vp−(Vm)/2V). At 1306, the point in the input buffer is considered to be the maximum peak if it has a maximum value and was preceded, to the left, by a lower value by the threshold. At 1308, the total number of peaks are counted. At 1310, the total number of peaks is detected based on the output at 1308.

FIGS. 14A-14D are graphs representing repetition counting for various activities based on sensor data generated during performance of the activities, according to one embodiment. The Y axis of each graph corresponds to the variance (Var) on an axis of maximum variance. The variance is calculated for each of a plurality of samples of sensor data. The X axis of each graph corresponds to time. Each represents repetition counting by identification of peaks in the variance on the axes of maximum variance. Each peak is indicated by a circle. In one example, the graphs of FIGS. 14A-14D are based on sensor data generated by a sensor module 102 within an electronic device 100 worn by a user during performance of the activities.

Figure 14A:
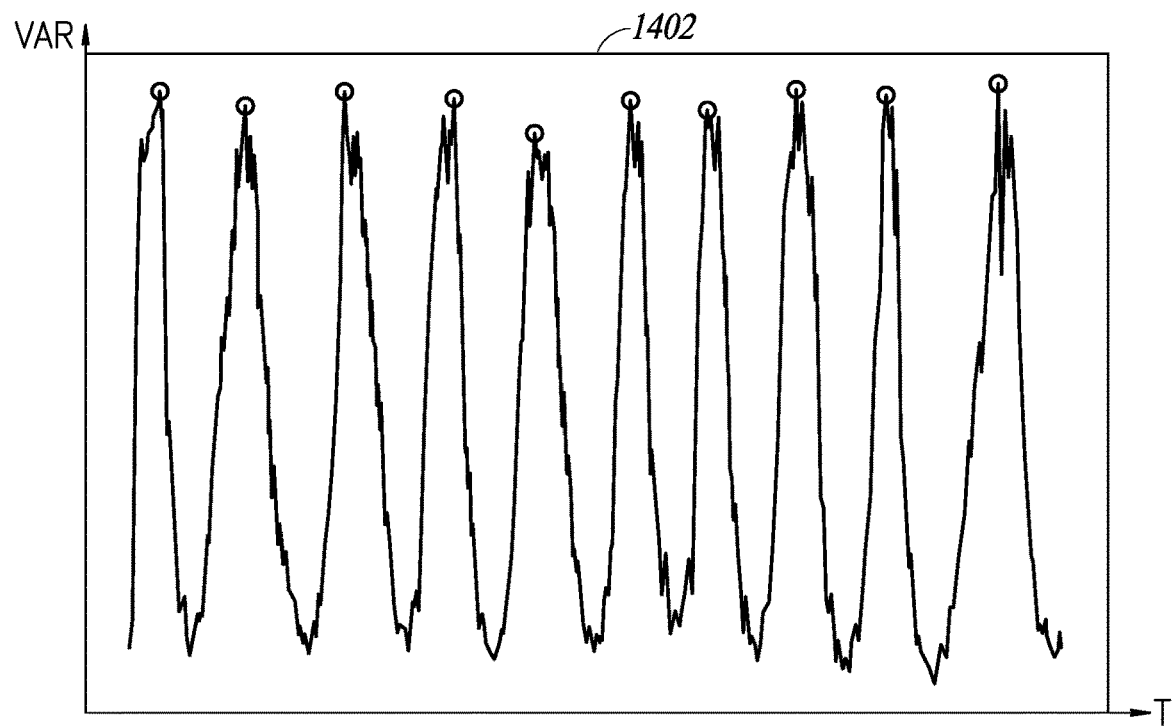
FIGS. 14A-D are graphs representing counting of exercise repetitions, according to one embodiment.

In one embodiment, FIG. 14A includes a graph 1402 representing the variance during performance of bicep curls, according to one embodiment. In the graph 1402, there are 10 peaks in the variance. This corresponds to 10 repetitions of bicep curls.

Figure 14B:
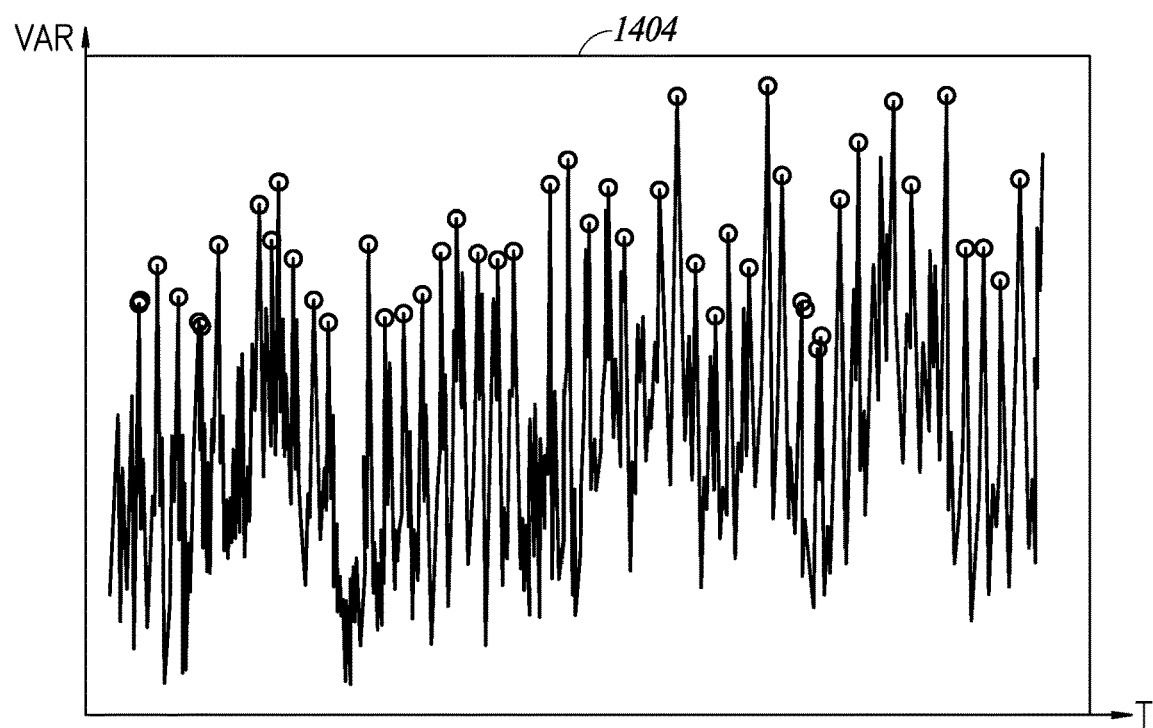

In one embodiment, FIG. 14B includes a graph 1404 representing the variance during performance of squats, according to one embodiment. In the graph 1404, there are 48 peaks in the variance. This corresponds to 48 repetitions of squats.

Figure 14C:
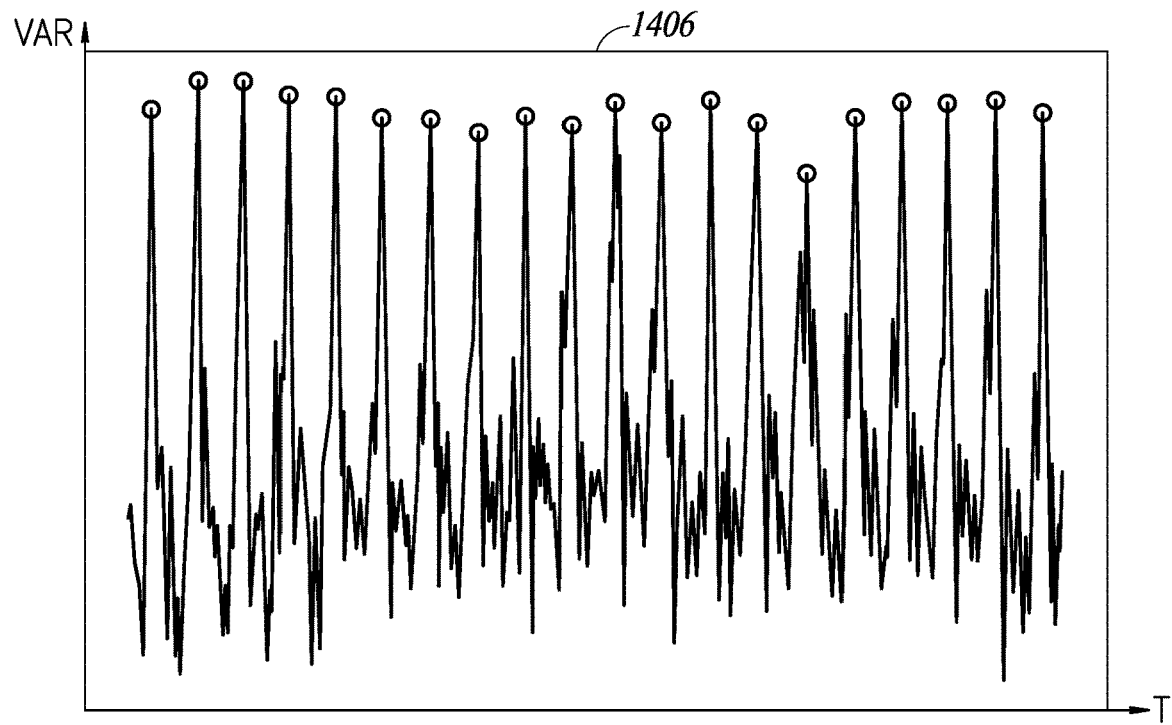

In one embodiment, FIG. 14C includes a graph 1406 representing the variance during performance of an overhead press exercise, according to one embodiment. In the graph 1406, there are 20 peaks in the variance. This corresponds to 20 repetitions the overhead press.

Figure 14D:
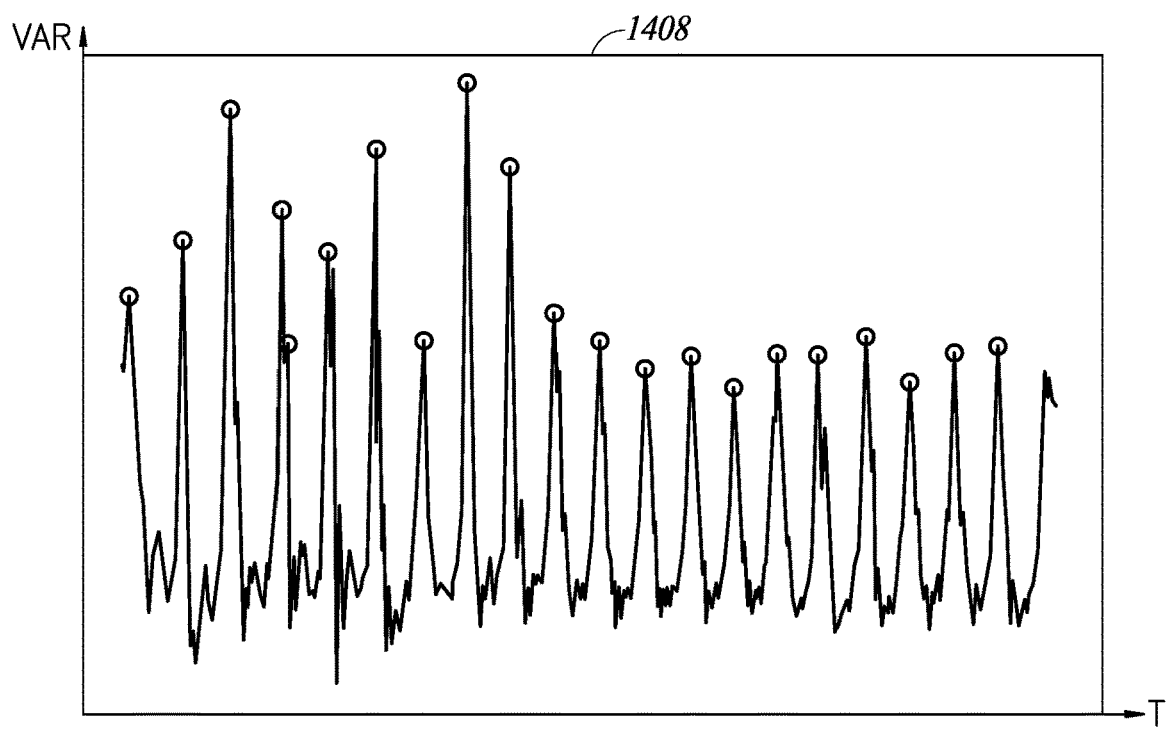

In one embodiment, FIG. 14D includes a graph 1408 representing the variance during performance of push-ups, according to one embodiment. In the graph 1408, there are 21 peaks in the variance. This corresponds to 21 repetitions of push-ups.

Figure 15:
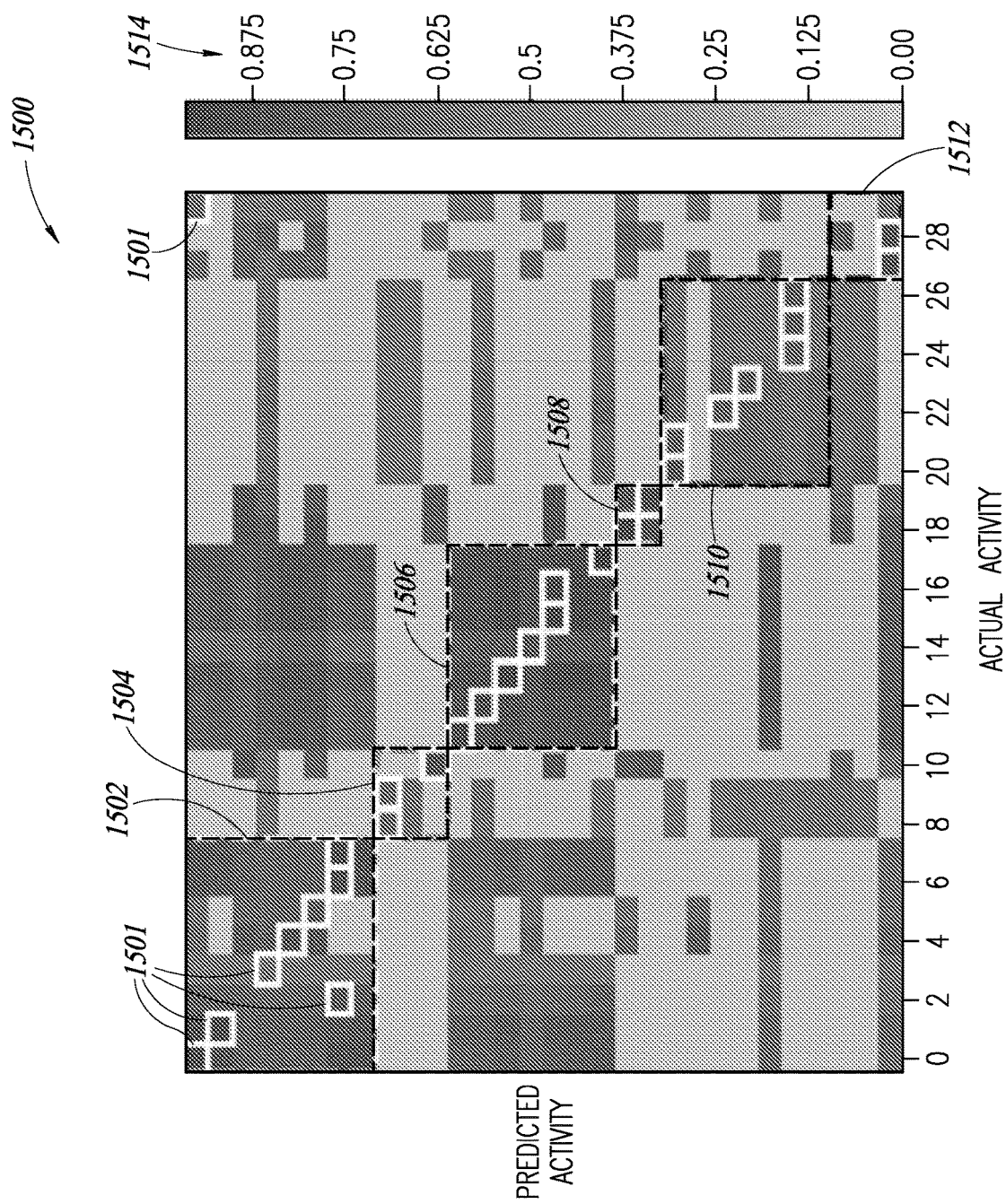
FIG. 15 is a chart representing experimental results for activity classification, according to one embodiment.

FIG. 15 is a heat map 1500 representing classification of exercise repetitions, according to one embodiment. The heat map includes templates for each of six different exercises previously learned by sensor module 102. The template 1502 corresponds to a template for bicep curls. The template 1504 corresponds to the template for jumping jacks. The template 1506 corresponds to a template for lack pull downs. The template 1508 corresponds to a template for overhead presses. The template 1510 corresponds to a template for push-ups. The template 1512 corresponds to a template for squats.

The X axis of the heat map 1500 corresponds to actual exercise repetitions for a plurality of types of exercises. The Y axis of the heat map 1500 corresponds to predicted exercise petitions for plurality of types of exercise motions. The heat map 1500 corresponds to a similarity metric calculated for each repetition. The value of the similarity metric is indicated by the darkness of each square. Heat map color legend is shown in 1514. The darker the value of a square, the higher the similarity metric value is for that square. The lighter the value of the square, the lower the similarity metric value is for that square.

The graph 1510 represents 30 different types of repetitions (shown as repetitions 0-29). Sensor data is generated and processed for each repetition. A similarity metric is calculated for each repetition. A classification square 1501 is indicated for each type of repetition. The classification square 1501 indicates the highest similarity metric value for that repetition. Accordingly, for each repetition on the X axis, there is a corresponding classification square 1501 on the Y axis indicating the Y location for which the highest similarity metric was calculated. While the graph 1500 places the templates 1502-1512 spaced apart from each other on the X axis. In practice, the graph 1500 can be thought of as 30 individual graphs in which each Y value on the graph falls within one of the templates. For example, the three lowest Y values correspond to the template 1512 for squats. The highest eight Y values correspond to the template 1502 for bicep curls, and so forth.

In the example of FIG. 15, the first eight repetitions are bicep curls. The sensor module 102 correctly classifies each of the first eight repetitions (repetitions 0-7 on the graph) as corresponding to bicep curls. This is indicated by the classification square 1501 for each of the first eight repetitions having a highest similarity metric value falling within the template 1502.

In the example of FIG. 15, the next three repetitions (repetitions 8-10 on the graph) are jumping jacks. The sensor module 102 correctly classifies each of these repetitions as corresponding to jumping jacks. This is indicated by the classification square 1501 for each of repetitions 8-10 having a highest similarity metric value falling within the template 1504.

In the example of FIG. 15, the next seven repetitions (repetitions 11-17) on the graph) are lat pulldowns. The sensor module 102 correctly classifies each of these repetitions as corresponding to lat pull downs. This is indicated by the classification square 1501 for each of repetitions 11-17 having a highest similarity metric value falling within the template 1506.

In the example of FIG. 15, the next two repetitions (repetitions 18 and 19) on the graph) are overhead presses. The sensor module 102 correctly classifies each of these repetitions as corresponding to overhead presses. This is indicated by the classification square 1501 for repetitions 18 and 19 having a highest similarity metric value falling within the template 1508.

In the example of FIG. 15, the next seven repetitions (repetitions 20-26 on the graph) are pushups. The sensor module 102 correctly classifies each of these repetitions as corresponding to pushups. This is indicated by the classification square 1501 for each of repetitions 20-26 having a highest similarity metric value falling within the template 1510.

In the example of FIG. 15, the next three repetitions (repetitions 27-29) on the graph) are squats. The sensor module 102 correctly classifies repetitions 27 and 28 as corresponding to squats. This is indicated by the classification square 1501 for each of repetitions 27 and 28 having a highest similarity metric value falling within the template 1512. However, the sensor module 102 has incorrectly classified repetition 29 as corresponding to a bicep curl. This is indicated as the classification square 1501 for repetition 29 having a Y location corresponding to bicep curls. Accordingly, FIG. 15 illustrates an example in which a sensor module 102 has correctly classified 29 of 30 repetitions. In practice, the sensor module 102 may correctly classify every activity repetition.

The various embodiments described above can be combined to provide further embodiments. These and other changes can be made to the embodiments in light of the above-detailed description. In general, in the following claims, the terms used should not be construed to limit the claims to the specific embodiments disclosed in the specification and the claims, but should be construed to include all possible embodiments along with the full scope of equivalents to which such claims are entitled. Accordingly, the claims are not limited by the disclosure.

The invention claimed is:

1. A method, comprising:
   receiving, with an electronic device, a request from a user to train a sensor unit of the electronic device to recognize a first motion;
   prompting, with the electronic device, the user to remain stationary for a selected period of time;
   prompting, with the electronic device, the user to perform the first motion after remaining stationary for the selected period of time;
   generating, with the sensor unit, sensor data while the user performs the first motion;
   calculating a variance for each of three axes from the sensor data;
   selecting, from the three axes, two axes having two largest variances among the calculated variances;
   generating, with the sensor unit, a first template for the first motion based on the sensor data from the two axes, wherein the first template is two-dimensional based on the selected two axes having the two largest variances; and
   storing the first template in a memory of the sensor unit.

2. The method of claim 1, wherein generating the first template includes performing an unsupervised machine learning process with the sensor data.

3. The method of claim 1, comprising inferring, with the sensor unit after generating the first template, that the user is performing the motion based on sensor data recorded after generation of the first template.

4. The method of claim 3, wherein inferring includes:
   comparing the sensor data recorded after generation of the first template to the first template; and
   determining that the user is performing the motion if the sensor data matches the first template within a threshold tolerance.

5. The method of claim 1, comprising:
   receiving, with the electronic device, a request to train the sensor unit to recognize a second motion;
   prompting, with the electronic device, the user to remain stationary for the selected period of time;
   prompting, with the electronic device, the user to perform the second motion after remaining stationary for the selected period of time;
   generating, with the sensor unit, sensor data while the user performs the first motion;
   generating, with the sensor unit, a first template for the for the first motion; and
   storing the template in a memory of the sensor unit.

6. The method of claim 5, comprising, after generating the first template and the second template:
   generating new sensor data with the sensor unit while the user performs an activity;
   comparing the new sensor data to the first template and the second template;
   inferring, with the sensor unit, that the activity corresponds to the first motion if the new sensor data matches the first template; and
   inferring, with the sensor unit, that the activity corresponds to the second motion if the new sensor data matches the second template.

7. The method of claim 6, wherein comparing the new sensor data to the first template and the second template include:
   generating, with the new sensor data, a temporary template; and
   comparing the temporary template to the first template and the second template.

8. The method of claim 7, wherein:
   the sensor unit is an inertial sensor unit;
   the first sensor data, the second sensor data, and the third sensor data are inertial sensor data; and
   the first template, the second template, and the third template are respective heat maps of the respective inertial sensor data.

9. The method of claim 1, wherein the first motion is a weight lifting exercise.

10. The method of claim 1, wherein the first motion is a cardio vascular exercise.

11. An electronic device, comprising:
    a user input;
    a display; and
    a sensor unit including:
    a sensor;
    a learning module configured to perform an unsupervised machine learning process to generate a template representing a first motion of the user based on first sensor data from the sensor by calculating a variance for each of three axes from the sensor data, selecting, from the three axes, two axes having two largest variances among the calculated variances, and generating the template based on the sensor data from the two axes having the two largest variances, wherein the template is two-dimensional based on the selected two axes having the two largest variances; and
    an activity detection module configured to detect whether the user is performing the first motion by comparing new sensor data from the sensor to the first template.

12. The electronic device of claim 11, wherein the sensor includes an accelerometer.

13. The electronic device of claim 12, wherein the sensor includes a gyroscope.

14. The electronic device of claim 11, wherein the learning module is configured to:
    receive, via the user input, a request from the user to learn the first motion;
    prompt, via the display, the user to remain stationary for a selected period of time;
    prompt, via the display, the user to perform the first motion after remaining stationary for the selected period of time; and
    generate the first template based on the first sensor data.

15. The electronic device of claim 14, wherein the sensor unit includes a memory configured to store the first template.

16. The electronic device of claim 14, wherein the memory is configured to store a plurality of templates.

17. The electronic device of claim 16, wherein the activity detection module is configured to compare the new sensor data to the plurality of templates.

18. The electronic device of claim 17, wherein the electronic device is a smart watch.

19. A method, comprising:
receiving a request to train a sensor unit of an electronic device to recognize a motion of the electronic device;
generating, with the sensor unit, a template for the motion by performing an unsupervised machine learning process including:
recording sensor data during the motion;
calculating a variance for each of three axes from the sensor data;
selecting, from the three axes, two axes having two largest variances among the calculated variances; and
generating, with the sensor unit, the template for the first motion based on the sensor data from the two axes, wherein the template is two-dimensional based on the selected two axes having the two largest variances;
inferring, with the sensor unit after generating the template, that the electronic device is undergoing the motion based on sensor data recorded after generation of the template.

20. The method of claim 19, wherein the electronic device is a smart phone.

21. The method of claim 19, wherein the electronic device is a vehicle.

22. The method of claim 19, comprising inferring, with the sensor unit, that the electronic device is operating anomalously when sensor data recorded after generation of the template does not conform to the template.

* * * * *

UNITED STATES PATENT AND TRADEMARK OFFICE
CERTIFICATE OF CORRECTION

| | | |
|---|---|---|
| PATENT NO. | : 12,242,663 B2 | Page 1 of 1 |
| APPLICATION NO. | : 18/063584 | |
| DATED | : March 4, 2025 | |
| INVENTOR(S) | : Swapnil Sayan Saha et al. | |

It is certified that error appears in the above-identified patent and that said Letters Patent is hereby corrected as shown below:

In the Claims

Column 19, Claim 5, Lines 59-60:
"first template for the for the first motion; and"
Should read:
-- first template for the first motion; and --.

Signed and Sealed this
Twenty-second Day of April, 2025

Coke Morgan Stewart
*Acting Director of the United States Patent and Trademark Office*